(12) United States Patent
Davis

(10) Patent No.: US 12,073,400 B2
(45) Date of Patent: *Aug. 27, 2024

(54) METHOD AND SYSTEM FOR AN EFFICIENT CONSENSUS MECHANISM FOR PERMISSIONED BLOCKCHAINS USING AUDIT GUARANTEES

(71) Applicant: MASTERCARD INTERNATIONAL INCORPORATED, Purchase, NY (US)

(72) Inventor: Steven C. Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/580,144

(22) Filed: Jan. 20, 2022

(65) Prior Publication Data

US 2022/0141018 A1 May 5, 2022

Related U.S. Application Data

(63) Continuation of application No. 16/238,886, filed on Jan. 3, 2019, now Pat. No. 11,265,164, which is a
(Continued)

(51) Int. Cl.
*G06Q 20/40* (2012.01)
*G06F 16/22* (2019.01)
(Continued)

(52) U.S. Cl.
CPC ....... *G06Q 20/401* (2013.01); *G06F 16/2255* (2019.01); *G06F 16/23* (2019.01);
(Continued)

(58) Field of Classification Search
CPC ................ G06Q 20/065; G06Q 20/10; G06Q 20/38215; G06Q 20/3825–3827;
(Continued)

(56) References Cited

U.S. PATENT DOCUMENTS 7,565,433 B1 * 7/2009 Lamport .............. G06Q 10/107
709/227
9,432,298 B1 8/2016 Smith
(Continued)

FOREIGN PATENT DOCUMENTS

| CN | 104580253 A | 4/2015 |
| WO | 2016046820 A1 | 3/2016 |

OTHER PUBLICATIONS

Office Action dated Sep. 15, 2022, issued by the U.S. Patent and Trademark Office in corresponding U.S. Appl. No. 17/490,680, 24 pps.
(Continued)

*Primary Examiner* — Eric T Wong
(74) *Attorney, Agent, or Firm* — Panitch Schwarze Belisario & Nadel LLP

(57) ABSTRACT

Exemplary systems and methods for the addition of a block to a permissioned blockchain using efficient consensus are disclosed. The methods and systems may include receiving transaction messages having transaction values from consensus nodes and generating a Merkle root for the transaction messages using transaction references and a proposed block header having the Merkle root and a hash of the header of the most recently added block in a blockchain. The proposed block header may be hashed and transmitted with a proposal message having a digital signature to auditing nodes. A response message accepting the digital signature may be received and an accept message may be transmitted to the auditing nodes and a confirmation message may be transmitted to the consensus-nodes. A new block may be written to the blockchain having the transaction values from the transaction messages and a header including the proposed block header and digital signature.

24 Claims, 12 Drawing Sheets

Related U.S. Application Data continuation of application No. 15/163,007, filed on May 24, 2016, now Pat. No. 10,204,341.

(51) Int. Cl.

| | |
|---|---|
| *G06F 16/23* | (2019.01) |
| *G06F 16/2457* | (2019.01) |
| *G06F 16/9535* | (2019.01) |
| *G06Q 20/06* | (2012.01) |
| *G06Q 20/10* | (2012.01) |
| *G06Q 20/38* | (2012.01) |
| *H04L 9/08* | (2006.01) |
| *H04L 9/30* | (2006.01) |
| *H04L 9/32* | (2006.01) |
| *H04L 9/40* | (2022.01) |

(52) U.S. Cl.
CPC .... *G06F 16/24575* (2019.01); *G06F 16/9535* (2019.01); *G06Q 20/065* (2013.01); *G06Q 20/10* (2013.01); *G06Q 20/38215* (2013.01); *H04L 9/0861* (2013.01); *H04L 9/30* (2013.01); *H04L 9/321* (2013.01); *H04L 9/3247* (2013.01); *H04L 63/06* (2013.01); *H04L 2209/56* (2013.01)

(58) Field of Classification Search
CPC ....... G06Q 20/401; H04L 9/0861; H04L 9/30; H04L 9/321; H04L 9/3247; H04L 63/06; H04L 2209/56
See application file for complete search history.

(56) References Cited

U.S. PATENT DOCUMENTS

| | | | | |
|---|---|---|---|---|
| 9,608,829 | B2* | 3/2017 | Spanos | H04L 9/3268 |
| 9,774,578 | B1* | 9/2017 | Ateniese | G06F 3/0673 |
| 9,875,510 | B1* | 1/2018 | Kasper | G06Q 40/12 |
| 2006/0136781 | A1* | 6/2006 | Lamport | G06F 11/1482 714/25 |
| 2008/0229103 | A1 | 9/2008 | Mutka et al. | |
| 2012/0084459 | A1 | 4/2012 | Wu et al. | |
| 2013/0159724 | A1 | 6/2013 | Kim et al. | |
| 2014/0075151 | A1 | 3/2014 | Cain et al. | |
| 2014/0115297 | A1 | 4/2014 | Cain et al. | |
| 2016/0028552 | A1* | 1/2016 | Spanos | H04L 9/3242 713/178 |
| 2016/0154698 | A1 | 6/2016 | Kazi | |
| 2016/0224949 | A1* | 8/2016 | Thomas | G06Q 20/02 |
| 2017/0060941 | A1 | 3/2017 | Yan et al. | |
| 2017/0075941 | A1* | 3/2017 | Finlow-Bates | H04L 67/104 |
| 2017/0103468 | A1* | 4/2017 | Orsini | H04L 9/3239 |
| 2017/0109735 | A1* | 4/2017 | Sheng | G06Q 20/3678 |
| 2017/0148016 | A1 | 5/2017 | Davis | |
| 2017/0221052 | A1* | 8/2017 | Sheng | H04L 9/14 |
| 2017/0228731 | A1* | 8/2017 | Sheng | G06Q 20/36 |
| 2017/0236120 | A1* | 8/2017 | Herlihy | G06Q 20/065 705/67 |
| 2017/0237554 | A1* | 8/2017 | Jacobs | H04W 12/106 713/171 |
| 2018/0089041 | A1* | 3/2018 | Smith | H04L 9/3239 |
| 2018/0248686 | A1 | 8/2018 | Alakuijala et al. | |

OTHER PUBLICATIONS

Vukolic, et al., "The Quest for Scalable Blockchain Fabric: Proof-of-work vs. BFT Replication", Netowrk and Parallel Computing; [Lecture Notes in Computer Science; Leet Notes Comptuter], Springer International Publishing, Cham, May 2016, pp. 112-125.
Wood, "Ethereum: a Secure Decentralised Generalised Transaction Ledge Homestead Draft", Mar. 30, 2016, (Mar. 30, 2016), XP055393071, Retrieved from the Internet: URL:http://web.archive.org/web/20160330220735if_/http://gavwood.com/paper.pdf [retrieved on Jul. 21, 2017] p. 1-p. 32.
Office Action (Decision to refuse a European Patent application) issued Dec. 9, 2021, by the European Patent Office in corresponding European Patent Application No. 17 734 533.7-1222. (14 pages).
"Bitcoin Developer Guide", retrieved from the Internet: URL: https://web.archive.org/web/20160515171209/https://bitcoin.org/en/developer-guide, 50 pages.
Anonymous: "Developer Guide—Bitcoin", (May 15, 2016), retrieved from the Internet: URL: hllps://web.archive.org/web/20160515171209/hllps://bitcoin.org/en/developer-guide, XP055393101 . (50 pages).
Buterin, Vitalik, "Light Clients and Proof of Stake", Jan. 10, 2015. (Year: 2015).
Buterin, Vitalik, "Slasher Ghost, and Other Developments in Proof of Stake", Oct. 3, 2014. (Year: 2014).
Office Action (First Office Action) issued Jun. 23, 2021, by the China National Intellectual Property Administration in corresponding Chinese Patent Application No. 201780032306.7 and an English Translation of the Office Action. (13 pages).
Office Action (Communication pursuant to Article 94(3) EPC) issued on Sep. 26, 2019, by the European Patent Office in corresponding European Patent Application No. 17 734 533.7-1222. (7 pages).
Office Action (Summons to attend oral proceedings pursuant to Rule 115(1) EPC) issued on Dec. 21, 2020, by the European Patent Office in corresponding European Patent Application No. 17 734 533.7-1222. (12 pages).
Fromknecht, et al., "CertCoin: A NameCoin Based Decentralized Authentication System 6.857 Class Project", May 14, 2014 (19 pages).
Gervais, et al., "On the Privacy Provisions of Bloom Filters in Lightweight Bitcoin Clients", 2014, pp. 326-335.
Office Action (Examination Report) issued on Aug. 28, 2020, by the Intellectual Property India in corresponding India Patent Application No. 201817007048 with an English Translation of the Office Action. (6 pages).
Knecht et al., "A space- and lime-efficient Implementation of the Merkle Tree Traversal Algorithm," arXiv:1409.4081v1 [cs.CR], (Sep. 14, 2014), pp. 1-19.
Kwon, Jae, "Tendermint: Consensus without Mining", 2014. (Year: 2014).
Noyes, "BitAV: Fast Anti-Malware by Distributed Blockchain Consensus and Feedforward Scanning", arXiv.1601.01405v1 [csCR], Jan. 7, 2016 (10 pages).
Ongaro, Diego et al. "In Search of an Understandable Consensus Algorithm", Proceedings of USENIX ATC '14: 2014 USENIX Annual Technical Conference, Jun. 19-20, 2014. (Year: 2014).
Svetinovic, Davor, "Towards Reference Architecture for Cryptocurrencies: Bitcoin Architectural Analysis", Sep. 2014. (Year: 2014).
Swan, "Blockchain Blueprint for a New Economy", Published on Dec. 31, 2015, Retrieved on: Aug. 21, 2020, URL: http://book.itep.ru/depository/blockchain/blockchain-by-melanie-swan.pdf. (149 pages).
Todd, Peter, "Ripple Protocol Consensus Algorithm Review", May 11, 2015. (Year: 2015).
International Search Report and Written Opinion issued Jul. 31, 2017 by the International Searching Authority in corresponding PCT application No. PCT/US2017/028224 (13 pages).
Wood, "ethereum/guide/poa.md at c2786cf535afefb26db51 d4889457e51 02cb56d4. GitHub", Nov. 18, 2015 (Nov. 18, 2015), pp. 1-7, XP055748069, Retrieved from the Internet: URL:https://github.com/ethereum/guide/blob/c2786cf535afefb26db51 d4889457 e5102cb56d4/poa.md [retrieved on Nov. 9, 2020].
Wood, "History for poa.md- ethereum/guide. GitHub", Nov. 18, 2015 (Nov. 18, 2015), pp. 1-1, XP0557 48071, Retrieved from the Internet: URL:https://github.com/ethereum/guide/commits/master/poa.md [retrieved on Nov. 9, 2020].
Yuan et al., "Blockchain: The State of the Art and Future Trends," ACTA Automatica Sinica, (Apr. 15, 2016), pp. 1-19 partial English translation of the article only, 1 page).
Extended European Search Report, dated Jul. 7, 2023, issued in corresponding European Application serial No. 23170204.4-1203, 7 pgs.

(56) References Cited

OTHER PUBLICATIONS

Notice of Allowance, dated Jan. 20, 2023, issued by the U.S. Patent and Trademark Office in corresponding U.S. Appl. No. 17/490,680, 8 pps.
Extended European Search Report, dated Sep. 13, 2023, issued in corresponding European Application No. 23176809.4-1218, 6 pgs.
BitFury Group et al., "Public versus Private Blockchains, Part 2: Permissionless Blockchains", Oct. 20, 2015 (Version 1.0), 19 pgs.

* cited by examiner

METHOD AND SYSTEM FOR AN EFFICIENT CONSENSUS MECHANISM FOR PERMISSIONED BLOCKCHAINS USING AUDIT GUARANTEES

FIELD

The present disclosure relates to the consensus of a permissioned blockchain, specifically the use of audit guarantees for efficient consensus of new blocks added to a permissioned blockchain and the use of bloom filters for recovery of desynchronized nodes.

BACKGROUND

Blockchains are decentralized, distributed databases that can be used to maintain a verified, and often publicly accessible, record of data. Recently, blockchains have seen increasing use via a mechanism for the storage and verification of transaction records for cryptographic currency transactions. Being a decentralized, distributed database, blockchains typically require a significant computational effort in order to have new blocks added to the chain verified. In many instances, this verification is performed via "proof of work," which is performed by nodes in the blockchain network and involves performing a very high number of computations. Over time, the processing power necessary in order to provide consensus in a blockchain via proof of work has grown to the point where it can be prohibitively expensive and time consuming.

However, for a decentralized database, consensus may be necessary to ensure that each distribution of the database is accurate and matches the other distributions. Unfortunately, many computing devices that may benefit from the use of a blockchain, acting as nodes therefore, may lack the processing power necessary to be able to participate via the performing of proof of work or other existing consensus mechanisms. In addition, existing consensus mechanisms often take a considerable amount of time in order for the consensus to be resolved. For instance, proof of work for Bitcoin, one of the most popular implementations of a blockchain, often takes upwards of ten minutes. In many instances, this length of time may be unacceptable for a blockchain implementation.

Thus, there is a need for a technical solution for a consensus mechanism for a blockchain that can be performed quickly, efficiently, and with a minimal amount of processing power as compared to existing blockchain implementations and consensus mechanisms. A faster, more efficient consensus mechanism may enable a blockchain to be implemented more easily and distributed among computing devices with lower system specifications, while also ensuring consensus for new transactions and other records added to the blockchain more quickly.

SUMMARY

The present disclosure provides a description of systems and methods for adding blocks to a permissioned blockchain using an efficient consensus mechanism.

A method for adding a block to a permissioned blockchain using an efficient consensus mechanism includes: storing, in a memory of a processing server, a blockchain comprising a plurality of blocks including a recently added block, the recently added blocking including at least a block header and one or more transaction values; receiving, by a receiving device of the processing server, a plurality of transaction messages from one or more consensus nodes associated with the blockchain, wherein each transaction message includes at least a transaction value; generating, by a hashing module of the processing server, a Merkle root for the plurality of transaction messages using a transaction reference associated with the transaction value included in each of the plurality of transaction messages; generating, by the hashing module of the processing server, a previous hash value via application of a hashing algorithm to the block header included in the recently added block; generating, by a generation module of the processing server, a proposed block header, wherein the proposed block header includes at least the previous hash value and the generated Merkle root; generating, by the hashing module of the processing server, a confirmation hash value via application of the hashing algorithm to the generated proposed block header; generating, by the generation module of the processing server, a proposal number, wherein the proposal number is a numeric value of a digital signature generated for the generated proposed block header; electronically transmitting, by a transmitting device of the processing server, a prepare message to a plurality of auditing nodes associated with the blockchain, wherein the prepare message includes at least the generated confirmation hash value and generated proposal number; receiving, by the receiving device of the processing server, a response message from at least a majority of the plurality of auditing nodes, wherein each prepare response message includes at least the generated confirmation hash value and an accepted proposal number; identifying, by a data identification module of the processing server, an agreed proposal number based on the numeric value of the generated proposal number and a numeric value of the accepted proposal number included in each response message and a predetermined criteria; electronically transmitting, by the transmitting device of the processing server, an accept message to the plurality of auditing nodes, wherein the accept message includes at least the generated confirmation hash value and the identified agreed proposal number; electronically transmitting, by the transmitting device of the processing server, a confirm message to a plurality of consensus nodes associated with the blockchain, wherein the confirm message includes at least the generated confirmation hash value and the identified agreed proposal number; and executing, by a querying module of the processing server, a query on the memory to add a new block to the blockchain, the new block including at least the transaction value included in each of the plurality of transaction messages a new block header including at least the previous hash value, the generated Merkle root, and the agreed proposal number.

A system for adding a block to a permissioned blockchain using an efficient consensus mechanism includes: a transmitting device of a processing server; a data identification module of the processing server; a querying module of the processing server; a memory of the processing server configured to store a blockchain comprising a plurality of blocks including a recently added block, the recently added blocking including at least a block header and one or more transaction values; a receiving device of the processing server configured to receive a plurality of transaction messages from one or more consensus nodes associated with the blockchain, wherein each transaction message includes at least a transaction value; a hashing module of the processing server configured to generate a Merkle root for the plurality of transaction messages using a transaction reference associated with the transaction value included in each of the plurality of transaction messages, and a previous hash value via application of a hashing algorithm to the block header included in the recently added block; and a generation module of the processing server configured to generate a proposed block header, wherein the proposed block header includes at least the previous hash value and the generated Merkle root. The hashing module of the processing server is further configured to generate a confirmation hash value via application of the hashing algorithm to the generated proposed block header. The generation module of the processing server is further configured to generate a proposal number, wherein the proposal number is a numeric value of a digital signature generated for the generated proposed block header. The transmitting device of the processing server is configured to electronically transmit a prepare message to a plurality of auditing nodes associated with the blockchain, wherein the prepare message includes at least the generated confirmation hash value and generated proposal number. The receiving device of the processing server is further configured to receive a response message from at least a majority of the plurality of auditing nodes, wherein each prepare response message includes at least the generated confirmation hash value and an accepted proposal number. The data identification module of the processing server is configured to identify an agreed proposal number based on the numeric value of the generated proposal number and a numeric value of the accepted proposal number included in each response message and a predetermined criteria. The transmitting device of the processing server is further configured to electronically transmit: an accept message to the plurality of auditing nodes, wherein the accept message includes at least the generated confirmation hash value and the identified agreed proposal number; and a confirm message to a plurality of consensus nodes associated with the blockchain, wherein the confirm message includes at least the generated confirmation hash value and the identified agreed proposal number. The querying module of the processing server is further configured to execute a query on the memory to add a new block to the blockchain, the new block including at least the transaction value included in each of the plurality of transaction messages a new block header including at least the previous hash value, the generated Merkle root, and the agreed proposal number.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a permissionless, distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency. In some cases, participation in a blockchain (e.g., as a node submitting and/or confirming transactions) may be permissionless (e.g., not moderated or restricted). In other cases, a blockchain may be a permissioned blockchain where only authorized computing devices may operate as nodes, where a level of participation may be based on permissions associated therewith.

Figure 1:
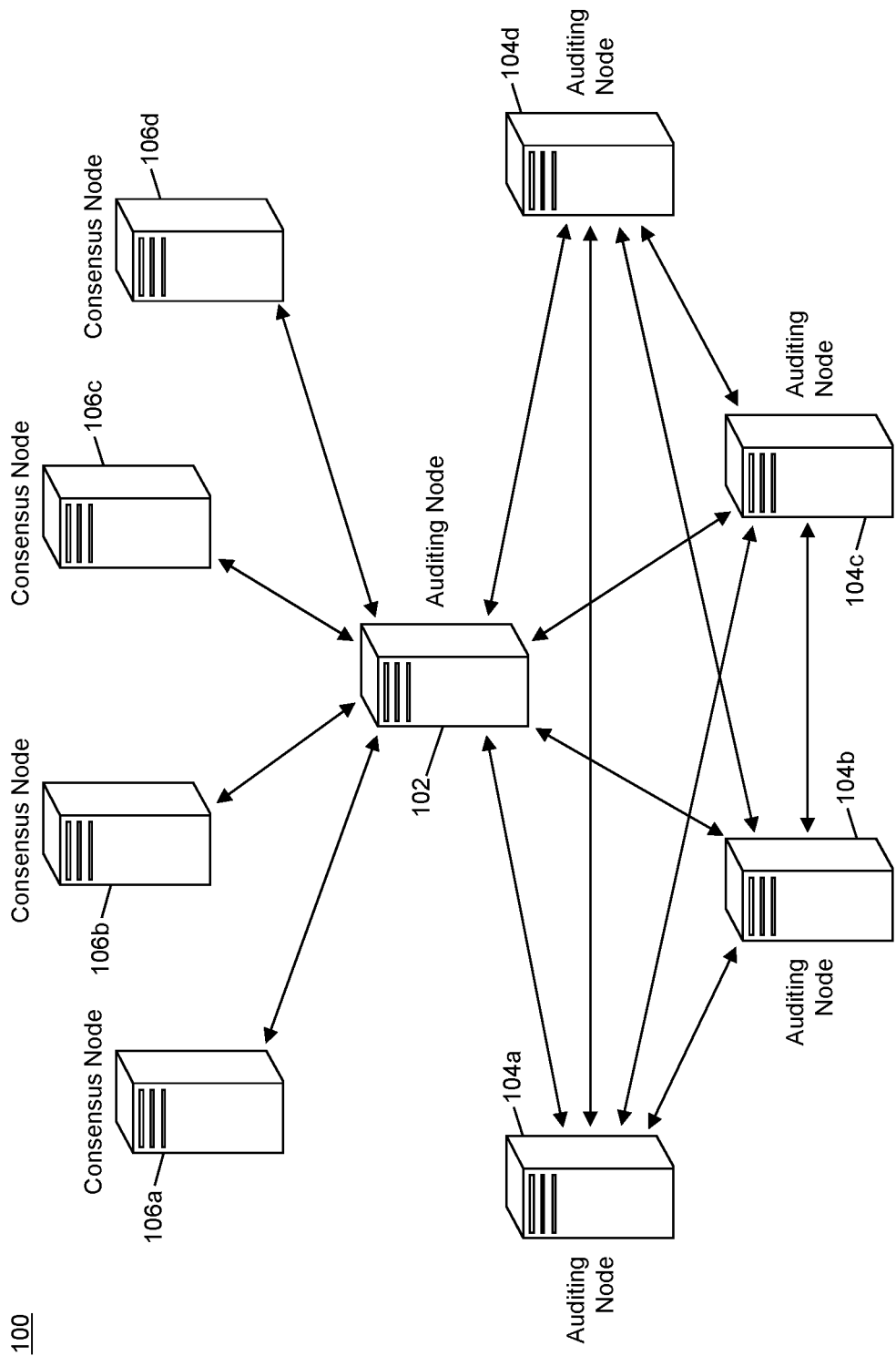
FIG. 1 is a block diagram illustrating a high level system architecture for the efficient consensus and recovery of desynchronized nodes in a permissioned blockchain network in accordance with exemplary embodiments.

System for Efficient Consensus and Recovery in a Permissioned Blockchain Network FIG. 1 illustrates a system 100 for the use of an efficient consensus mechanism for consensus of new blocks added to a permissioned blockchain network and the recovery of desynchronized nodes included therein.

The system 100 may include an auditing node 102. The auditing node 102 may be a part of a permissioned blockchain network. The permissioned blockchain network may be a network of a plurality of nodes associated with a permissioned blockchain. The permissioned blockchain may be a blockchain where participation therein for the contribution of and consensus of new blocks, and transactions and other data included therein, to be added to the blockchain may be restricted to authorized (e.g., "permissioned") nodes. In the system 100, the permissioned blockchain network may be comprised of a plurality of auditing nodes 104 and consensus nodes 106. As discussed in more detail below, consensus nodes 106 may be configured to receive and contribute transactions for inclusion in the permissioned blockchain, and auditing nodes 104 may be configured to perform the functions of a consensus node as well as being configured to perform a consensus audit, for auditing of new blocks to be added to the permissioned blockchain. In some embodiments, a permissioned blockchain may include additional types of nodes, such as member or application nodes that contribute transactions but do not participate in consensus, and other nodes that may be suitable depending on the functions and implementation of the permissioned blockchain.

The auditing node 102 may be a processing server or other specially configured computing device and/or system configured to perform the functions of both a consensus node 106 and an auditing node 104. The auditing node 102 may be connected via a suitable communication network and methods to a plurality of consensus nodes 106, illustrated in FIG. 1 as consensus nodes 106a, 106b, 106c, and 106d. Each of the consensus nodes 106 in the permissioned blockchain network may be connected to a plurality of other consensus nodes 106 in any suitable network topology. For example, consensus nodes 106 may be connected using a mesh topology. In some instances, some consensus nodes 106 may only be connected to other consensus nodes, and may not be connected to an auditing node 104. Each of the other auditing nodes 104 in the blockchain network may also be connected to a plurality of consensus nodes 106, in addition to being connected to each of the other auditing nodes 104. In some instances, a consensus node 106 may be connected to only a single auditing node, such as the auditing node 102 or one of the other auditing nodes 104.

The auditing node 102 may, in performing the functions of an auditing node 104, be connected to a plurality of auditing nodes 104 using a suitable communication network and methods. In an exemplary embodiment, the number of auditing nodes 104 in the permissioned blockchain network may be limited to a maximum number, such as for a faster, more efficient consensus using the methods discussed herein. For example, a permissioned blockchain network may limit the number of auditing nodes 104 to seven, even in instances where the number of consensus nodes may be in the thousands, tens of thousands, hundreds of thousands, or even greater. In some cases, the number of auditing nodes 104 may be an odd number, such as for the determination of a majority thereof during the consensus audit, as discussed in more detail below. In an exemplary embodiment, each of the auditing nodes 104 may be interconnected, such as illustrated in FIG. 1 where each of the auditing nodes 104 are connected to each of the other auditing nodes. In some instances, the auditing nodes 104 may be geographically distributed in the permissioned blockchain network, such as to reduce the likelihood of a significant network disconnect or partition.

In the system 100, the auditing node 102, and other nodes in the permissioned blockchain network configured to perform the functions of a consensus node 106 (e.g., each of the consensus nodes 106 and auditing nodes 104), may receive transaction messages from application nodes or other nodes in the permissioned blockchain network configured to contribute data for transactions to be added to the permissioned blockchain. Transaction messages may be electronically transmitted to the auditing node 102 via a suitable communication network, and may include at least a transaction value. The transaction value may be a transaction record or other value to be added to the permissioned blockchain. For instance, the transaction value may be a transaction record that includes destination and source addresses and digital signatures associated therewith and a transaction amount for an amount of cryptographic currency transferred from the destination address to the source address or addresses. In another instance, the transaction value may be an alphanumeric or other suitable type of value that represents a transaction or other data, such as in an opaque, permissioned blockchain. Additional data regarding opaque blockchains may be found in U.S. patent application Ser. No. 14/950,117, entitled "Method and System for Gross Settlement by the Use of an Opaque Blockchain," filed on Nov. 24, 2015, by Steven C. Davis, which is herein incorporated by reference in its entirety.

In some embodiments, transaction messages may also include a slot identifier. The slot identifier may be an identification value representative of a slot to which the corresponding transaction value belongs. The slot may be a demarcation or other categorical organization used for the organization of transactions to be added to the permissioned blockchain. In an exemplary embodiment, a slot may be associated with a time or range of times to which the associated transactions correspond. For example, a slot may be associated with a second in time, where each transaction associated with the slot's corresponding slot identifier may be a transaction conducted at that second in time. In such an example, the slot identifier may be a representation of that second in time, such as a timestamp in seconds since the start of the UNIX epoch or other suitable date and time representation that indicates that second. For instance, the slot identifier for all transactions conducted at the first second of 2016 may be 1451606400.

When the auditing node 102 receives a transaction message, the auditing node 102 may determine if the transaction value included in that transaction message is already stored in a local database of unconfirmed transaction values to be added to the permissioned blockchain. In instances where the transaction message includes a slot identifier, the determination may be based on inclusion of that transaction value in a storage of transaction values for the included slot identifier. If that transaction value has not already been received, then the auditing node 102 may store the transaction value with other transaction values for that slot identifier. The auditing node 102 may then rebroadcast that transaction message to each consensus node 106 connected thereto. The connected consensus nodes 106 may receive the transaction message and also perform the determination, storage, and rebroadcast as necessary. If the transaction value has already been received by the auditing node 102, then the auditing node 102 may ignore the transaction message and may not rebroadcast the transaction message. The auditing node 102 may repeat the process for each transaction message received from application nodes, as well as transaction messages rebroadcast from consensus nodes 106 connected thereto.

As a result, the auditing node 102 and each of the consensus nodes 106 may quickly propagate all transaction messages throughout the permissioned blockchain network. Due to rebroadcasting only occurring in instances where a transaction message has not been previously received (e.g., due to lack of the transaction value in the stored list of unconfirmed transactions), traffic in the permissioned blockchain network may be kept to a minimum with the number of redundant transaction messages received minimized.

In some embodiments, the auditing node 102 may be configured to generate reference values for each transaction value received and added to the list of unconfirmed transactions. Reference values may be a hash value or other representation of the transaction value as a single value. In instances where the transaction value may already be a reference value, such as in an opaque blockchain, the transaction value itself may be used as the reference value. In other instances, such as when the transaction value is a transaction record that includes a number of data values, the transaction record may be hashed by the auditing node 102 via one or more predetermined hashing algorithms to obtain the corresponding transaction reference value. In such embodiments, the list of unconfirmed transactions may be a list of transaction reference values. In such an instance, the auditing node 102 may generate the reference value for each received transaction value prior to the determination if the transaction value has already been received.

The auditing node 102, and other nodes performing the functions of consensus nodes 106, may be configured to keep a timestamp of the arrival of transaction messages. In such instances, the auditing node 102 may update the timestamp each time a new transaction message is received, where the timestamp therefore indicates the time of arrival of the latest transaction message. In some instances, such as when each slot identifier represents a single second, the timestamp used by the auditing node 102 to mark the latest arrival of a transaction message may use milliseconds, nanoseconds, or other representation smaller than the slot identifier.

The auditing node 102 and other consensus nodes 106 may continue to receive transaction messages and then perform a consensus proposal. In some embodiments, the auditing node 102 may begin the consensus proposal process after a predetermined period of time since the arrival of the last transaction message (e.g., as indicated by the timestamp therefor), referred to herein as a "consensus delay time." In some cases, the consensus delay time may be considered by the auditing node 102 as the time between the timestamp marking the arrival of the latest transaction message and a time when the auditing node 102 was open to receive transaction messages for that slot identifier, with an additional buffer interval. In some cases, the consensus delay time may be different for each consensus node 106, such as based on the location of the consensus node 106 in the permissioned blockchain network and other considerations. In some embodiments, the consensus delay time may be recalculated based on performance of the permissioned blockchain network. For instance, the consensus delay time may be recalculated at a periodic interval (e.g., hourly, daily, etc.).

Consensus proposal may be a process in which the auditing node 102 and other consensus nodes 106 propose a consensus for the unconfirmed transactions that are to be added to the permissioned blockchain. In instances where a slot identifier is used, the consensus proposal may be with respect to a specific slot identifier. As part of the consensus proposal, the auditing node 102 may generate a Merkle root for the unconfirmed transactions. The Merkle root may be the value of the root node in a Merkle tree generated for the unconfirmed transactions that have been stored in the auditing node 102 (e.g., associated with the slot identifier, if applicable) from transaction messages. In instances where a transaction reference is generated for transaction values, the reference values may be used in the generation of the Merkle tree and subsequent identification of the Merkle root. The auditing node 102 may use one or more predetermined hashing algorithms to generate the Merkle root, by application thereof to the transaction references and subsequent hash values.

In some embodiments, the auditing node 102 and each consensus node 106 may be configured to order the transaction reference values prior to generation of the Merkle root, such that each consensus node 106 generates the Merkle root with the transaction references in the same order. In such embodiments, the transaction references may be ordered in a natural order based on the type of reference values. For instance, if the reference values are integers or alphanumeric values, they may be ordered in a natural ascending or descending order. The ordering of the transaction references, as well as the use of predetermined hashing algorithms, may ensure that the auditing node 102 and each consensus node 106 generates the same Merkle root if the respective node has received all of the transaction values for that slot identifier.

In order to determine if such a consensus has been reached (e.g., the auditing node 102 has generated the same Merkle root, and thus received the same transaction values, as the consensus nodes 106 connected thereto), the auditing node 102 may generate a proposal message. The proposal message may include at least the generated Merkle root, and may also include the slot identifier for the associated slot, if applicable. The auditing node 102 may electronically transmit the proposal message to each of the connected consensus nodes 106. Each of the connected consensus nodes 106 may also generate a proposal message, which may be transmitted therefrom to each of the other nodes connected thereto. As a result, the auditing node 102 may receive a proposal message from each of the connected consensus nodes 106. The auditing node 102 may store a list of each of the Merkle roots received from the neighboring (e.g., connected) consensus nodes 106.

The auditing node 102 may be configured to determine if there is a consensus among the auditing node 102 and its neighboring consensus nodes 106 via a comparison of the Merkle roots. If the Merkle roots received from the neighboring consensus nodes 106 match the Merkle root generated by the auditing node 102, then the auditing node 102 may consider itself to be synchronized with the rest of the permissioned blockchain network. If the Merkle root generated by the auditing node 102 is different from the Merkle roots received from the neighboring consensus nodes 106, then the auditing node 102 may be desynchronized, which may indicate that the auditing node 102 failed to receive one or more transaction values or may have included extraneous transaction references in the list of unconfirmed transactions. In instances where the auditing node 102 is desynchronized, the auditing node 102 may perform recovery processes, discussed in more detail below. If the Merkle root generated by the auditing node 102 matches a majority of the Merkle roots received from the neighboring consensus nodes 106, but one or more of the received Merkle roots are different, it may indicate that the consensus node 106 or nodes that supplied the different Merkle roots are out of sync, which may prompt their performing of recovery processes.

Once consensus proposals have been exchanged among the consensus nodes 106, a consensus audit may be performed. The consensus audit may be performed by the auditing node 102 and each of the auditing nodes 104 in the permissioned blockchain network. In an exemplary embodiment, the consensus audit may be performed using Paxos protocols adapted for usage in the system 100 for the consensus of the unconfirmed transactions by the auditing nodes 104 for addition to the permissioned blockchain. The consensus audit may be performed using digital signatures generated by the auditing node 102 and each of the auditing nodes 104, which may operate as the proposal number in the Paxos protocol, as discussed below.

To perform the consensus audit, the auditing node 102 may generate a temporary block header for the new block to be added to the permissioned blockchain that incorporates the unconfirmed transactions. The temporary block header may include at least the Merkle root generated for the unconfirmed transactions and a hash value of the block header of the prior block most recently added to the permissioned blockchain. The hash value of the block header of the prior block may be generated by the auditing node 102 using one or more predetermined hashing algorithms that may be the same used by each of the auditing nodes 104 in generating the hash value. In some embodiments, the temporary block header may also include additional data that may be included in headers of blocks added to the permissioned blockchain, such as a slot identifier or other data discussed in more detail below.

After generation of the temporary block header, the auditing node 102 may hash the temporary block header using the same one or more predetermined hashing algorithms used in the generation of the prior block header's hash value to generate a hash value for the temporary block header, referred to herein as a "block hash." The block hash may then be included in a prepare message generated by the auditing node 102. The prepare message may include the block hash, slot identifier, if applicable, and may also include a proposal number generated by the auditing node 102.

The proposal number may be a digital signature generated by the auditing node 102. In some instances, the auditing node 102 may use a collision-resistant algorithm for generation of the digital signature such that there is a higher likelihood of uniqueness of the proposal numbers generated by the auditing node 102 and each of the auditing nodes 104. For example, the auditing node 102 may use the elliptic curve digital signature algorithm (ECDSA) for generation of the digital signature. In such an example, the auditing node 102 may use a public key associated therewith for generation of the digital signature. In such embodiments, the public key may also be included in the prepare message. In some such embodiments, the public key may also be included in the temporary block header prior to generation of the block hash. In some embodiments, the auditing node 102 may also generate a random or pseudo-random nonce to be included in the prepare message to act as a cryptographic salt, which may also be included in the temporary block header prior to generation of the block hash.

Once the prepare message has been generated, the auditing node 102 may electronically transmit the prepare message to each of the auditing nodes 104 connected thereto. The auditing node 102 may similarly receive a prepare message from each of the auditing nodes 104 generated thereby. Each of the received prepare messages may include a different digital signature as a proposal number, generated via the respective associated public keys. Upon receipt of the prepare messages, the auditing node 102 may identify the highest (e.g., with respect to a natural ordering of the digital signatures) proposal number. It will be apparent to persons having skill in the relevant art that the use of the highest proposal number for consensus, as discussed herein, is merely illustrative, and that any other suitable criteria may be used for determining consensus of the proposal number, such as the lowest proposal number, the proposal number closest to a predetermined value, etc.

Once the auditing node 102 has identified the highest proposal number, the auditing node 102 may generate a prepare response message to send to the originator of the prepare message that included the highest proposal number. In instances where the highest proposal number was generated by the auditing node 102, the auditing node 102 may not generate a prepare response message. The prepare response message may include the digital signature that was identified as being the highest proposal number and, if applicable, the slot identifier associated with the slot for which consensus is being performed. In instances where the auditing node 102 has generated (e.g., and distributed) a higher proposal number than a neighboring auditing node 104, the auditing node 102 may receive a prepare response message from the neighboring auditing node 104, indicating that the digital signature generated by the auditing node 102 was higher.

When the auditing node 102 or other auditing node 104 receives a prepare response message from a majority of the auditing nodes 104, that node may enter into a consensus accept phase. In the accept phase, the auditing node 102 (e.g., or other node having received the majority prepare response messages) may generate an accept message. The accept message may include the same data included in the prepare message generated by that node, which would thus include the digital signature identified as being the highest proposal number. The accept message may then be electronically transmitted to each of the auditing nodes 104 that had provided a prepare response message to that node.

In instances where the auditing node 102 (e.g., or other auditing node 104) enters the accept phase and then receives a prepare message from a neighboring auditing node 104 that includes a higher proposal number, the auditing node 102 may generate a prepare response message as discussed above, but may also include the block hash, public key, and signature (e.g., and nonce, if applicable) that had been previously identified in the accept message generated thereby. The auditing node 104 with the higher proposal number would thus receive the prepare response message that shows that the auditing node 102 had entered the accept phase with its own proposal number. The auditing node 104 would, due to having a higher proposal number, receive prepare response messages from a majority of auditing nodes 104, and enter the accept phase itself. The auditing node 104 would generate accept messages that would be sent out to its neighboring auditing nodes 104, including the auditing node 102. The auditing node 102, receiving the accept message from the auditing node 104, would acknowledge the acceptance of the higher proposal number and record it accordingly as the highest received proposal number.

The process may be continued until each auditing node 104 has received an accept message with the highest proposal number generated by any of the auditing nodes 104. In instances where the number of auditing nodes 104 in the permissioned blockchain network may be limited (e.g., to seven or a similar number), the consensus audit may be resolved extremely quickly and efficiently, on the order of milliseconds or nanoseconds, with a minimal number of data exchanges, as auditing nodes 104 may only communicate with other auditing nodes 104 to acknowledge higher proposal numbers, enabling the highest proposal number to be propagated to each auditing node in the lowest possible number of transmissions.

Once the auditing node 102 has received the highest proposal number, either generated by itself or received in an accept message from another auditing node 104, the permissioned blockchain network may begin consensus confirmation. For the consensus confirmation, the auditing node 102 (e.g., and each of the other auditing nodes 104) may generate a confirmation message. The confirmation message may include the block hash generated and used in the consensus audit, as well as the digital signature accepted as being the highest proposal number. The confirmation message may also include the public key used in generation of the digital signature, if applicable, the nonce included in the accept message, if applicable, and the slot identifier to which the confirmation message applies, if applicable. The consensus message may then be electronically transmitted to each of the neighboring consensus nodes 104.

Upon receipt of the confirmation message, the consensus node 104 may generate the block header for the new block to be added to the permissioned blockchain that incorporates each of the unconfirmed transactions. The block header may include the Merkle root, slot identifier, and any other necessary data. The consensus node 104 may then hash the block header to verify that the resulting hash value (e.g., the "block hash") matches the block hash included in the confirmation message, to validate that the confirmation message is authentic. The digital signature may be included in the block header, which may be included in a new block generated by the consensus node 106 that includes the completed block header and the transaction values for each of the unconfirmed transactions. The consensus node 106 may then write that new block to the permissioned blockchain. The consensus node 106 may also remove the corresponding transaction references from its list of unconfirmed transactions remove the Merkle roots mapped to the associated slot from its storage. The consensus node 106 may rebroadcast the confirmation message to each of its own neighboring consensus nodes 106, to ensure that the confirmation message propagates throughout the permissioned blockchain network.

In embodiments where slot identifiers may be used, the auditing node 102 and other nodes in the permissioned blockchain network may be configured to perform actions related to multiple phases in the consensus process at the same time. In such embodiments, the use of slot identifiers may ensure that messages transmitted to and from the node are associated with the correct corresponding transactions. For instance, the auditing node 102 may be in possession of transaction values for four different slots at any given time due to processing times and consensus delay times. The auditing node 102 may thus have a different list of unconfirmed transactions for each slot. In such an example, consensus confirmation may be performed for a first slot, while the consensus audit is being performed for a second slot, while consensus proposals are being exchanged for a third slot, and while transaction messages are being received for a fourth slot.

In instances where the auditing node 102 or other node (e.g., an auditing node 104 or a consensus node 106) in the permissioned blockchain network may be out of synchronization ("desynchronized") with the rest of the permissioned blockchain network, the auditing node 102 may begin a recovery process. The auditing node 102 may identify a desynchronization if a Merkle root generated thereby does not match the Merkle root provided by a majority of the neighboring consensus nodes 106 that are received during the consensus proposal process. In such an instance, the auditing node 102 may be missing one or more unconfirmed transactions in its list of unconfirmed transactions, or may include extra unconfirmed transactions. Such a scenario may occur, for example, if a transaction message received by the auditing node 102 includes an incorrect slot identifier, or if a transaction reference is stored in the wrong list of unconfirmed transactions. When desynchronized, the auditing node 102 may identify a neighboring consensus node 106 that is synchronized, such as indicated by its respective proposal message having a Merkle root that matches the majority, and may electronically transmit a recovery message to that consensus node 106.

The recovery message may include the slot identifier associated with the slot for which the auditing node 102 is out of synchronization. The recovery message may also include a bloom filter. The bloom filter may be a bloom filter of the transaction references included in the list of unconfirmed transactions for the slot, where each of the transaction references are hashed a specified number of rounds (referred to herein as "hash rounds"), and where the bloom filter has a bitmap size that is at least double the number of unconfirmed transactions in the list of unconfirmed transactions for which the filter is being generated. In some embodiments, one or more of the hash rounds may use a different hashing algorithm, where use and ordering thereof may be known to each of the nodes in the permissioned blockchain network, or may be communicated in the recovery message. In other embodiments, the auditing node 102 may use the same hashing algorithm for each of the hash rounds. The auditing node 102 may include the bloom filter in the recovery message, and may also include the number of hash rounds, the size of the bloom filter, and a count of the number of unconfirmed transactions in the list of unconfirmed transactions for the slot being recovered.

The recovery message may then be electronically transmitted to the neighboring consensus node 106. The consensus node 106 may receive the recovery message and may determine if the auditing node 102 is missing transaction references or if there are extraneous transaction references in the auditing node's list of unconfirmed transactions. The determination may be based on the count included in the recovery message and a count of the unconfirmed transactions in the consensus node's own list for the slot.

In instances where the auditing node 102 is missing one or more transactions (e.g., the consensus node's count is higher), then the consensus node 106 may pass each of its unconfirmed transactions in the list through the bloom filter to determine which transaction references are missing in the auditing node's list. The use of a bitmap size of double the number of unconfirmed transactions may provide for significant accuracy in the estimation of the inclusion of a transaction reference in the bloom filter. The consensus node 106 may identify the transaction value for each of the transaction references that are identified as being missing in the auditing node's list, and may return a recovery response message to the auditing node 102 that includes the transaction values. The auditing node 102 may receive the recovery response message, generate the transaction references for the transaction values, update its list of unconfirmed transactions, and re-generate the Merkle root for the slot. The auditing node 102 may, based on the result of the generation of the Merkle root, be back in synchronization, or may continue to be desynchronized and may repeat the recovery process. For instance, a false positive in the use of the bloom filter by the consensus node 106 may result in the auditing node 102 still missing a transaction reference, which may be identified in the use of a second bloom filter.

In instances where the auditing node 102 may have one or more extraneous transaction references (e.g., the node's count is higher than the count of the consensus node 106), the consensus node 106 may generate its own bloom filter for each of the transaction references included in its own list of unconfirmed transactions. The consensus node 106 may reply to the recovery message with a recovery response message that includes the slot identifier, its own bloom filter, and the parameters associated with the new bloom filter (e.g., the count, the filter size, and the hash rounds). The consensus node 106 may electronically transmit the recovery response message to the auditing node 102. The auditing node 102 may then enter its transaction references into the bloom filter supplied by the consensus node 106 to identify which transaction references in its list are not in the bloom filter, and may remove those transactions from its list. The auditing node 102 may generate a new Merkle root for the slot, may determine if the auditing node 102 is synchronized, and may repeat the recovery process if necessary.

The use of a bloom filter may enable the auditing node 102 or another node in the permissioned blockchain network to perform recovery without the need to transmit entire blocks of the permissioned blockchain or significant numbers of transaction values, thus reducing network traffic and increasing network efficiency. The auditing node 102 and other nodes may still be able to exchange all transaction values for an unconfirmed slot or may be configured to exchange the completed block or block header for slot in instances where bloom filter recovery is unsuccessful, in order to maintain synchronization across all nodes in the permissioned blockchain network, but may only need to do so in such instances, thus reducing the network traffic. In addition, the use of slots for organization and separation of transactions in the permissioned blockchain network may provide for a suitable means of organization and demarcation that provides for faster recovery using bloom filters, while also largely maintaining synchronization. For instance, a desynchronized consensus node 106 may still be able to perform consensus proposals for later slots while recovering an earlier slot, provided that such recovery is finished before consensus confirmation of the later slots.

The methods and systems discussed herein provide for a more efficient mechanism for consensus of transactions in a permissioned blockchain network. The use of consensus proposals across consensus nodes 106, consensus audit in a limited number of auditing nodes 104, and consensus confirmation throughout the consensus nodes 106, when combined with recovery of desynchronized nodes using bloom filters, results in a permissioned blockchain network that can perform consensus on the order of seconds, or faster, using a minimal number of data message exchanges that can not only increase the speed at which consensus is reached, but increase the efficiency thereof, which reduces network traffic and congestion, thereby improving network performance and decreasing operating expenses. As a result, the consensus and recovery mechanisms discussed herein accomplish consensus faster, and more efficiently, than existing consensus mechanisms.

Auditing Node

Figure 2:
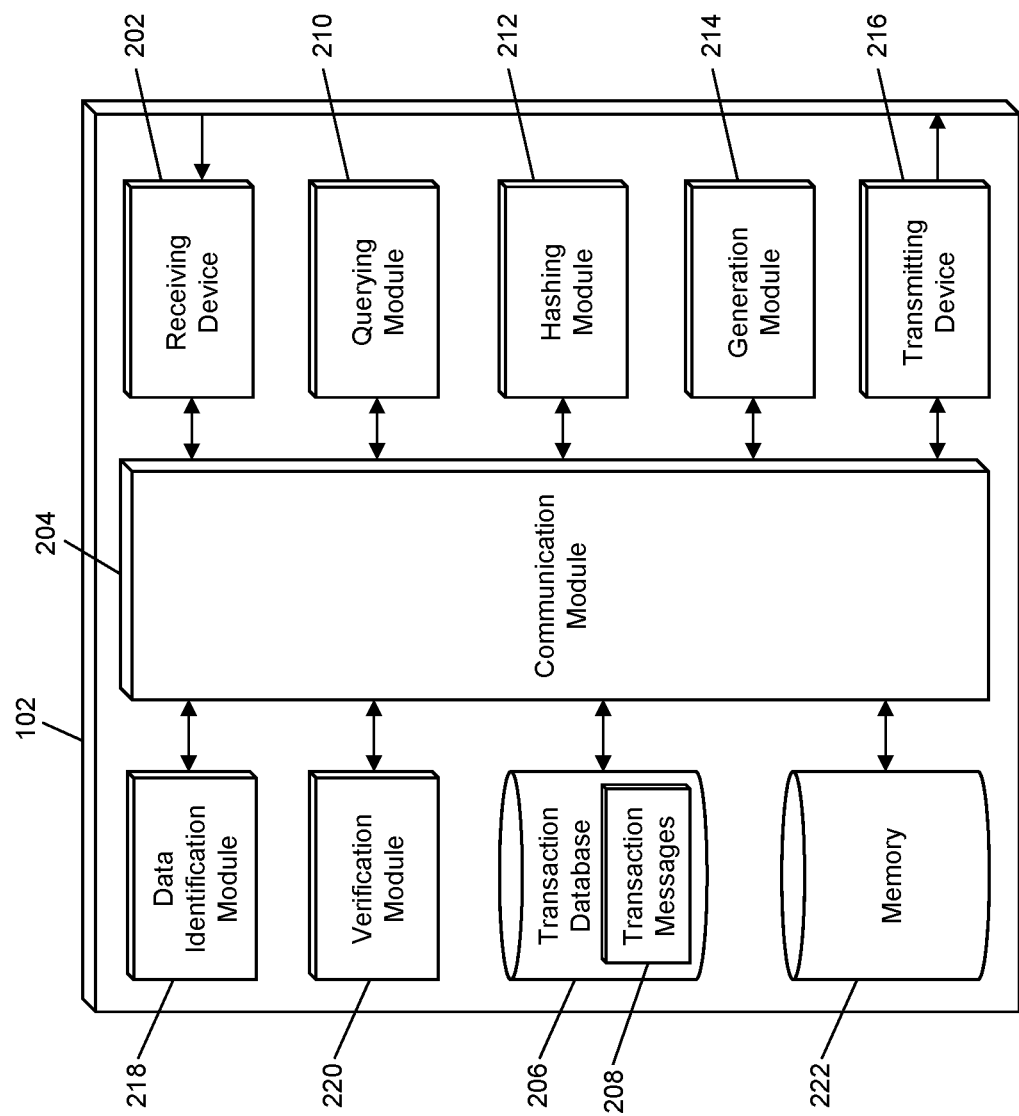
FIG. 2 is a block diagram illustrating the auditing node of FIG. 1 for the efficient consensus and recovery of desynchronized nodes in a permissioned blockchain network in accordance with exemplary embodiments.

FIG. 2 illustrates an embodiment of an auditing node 102 in the system 100. It will be apparent to persons having skill in the relevant art that the embodiment of the auditing node 102 illustrated in FIG. 2 is provided as illustration only and may not be exhaustive to all possible configurations of the auditing node 102 suitable for performing the functions as discussed herein. For example, the computer system 1100 illustrated in FIG. 11 and discussed in more detail below may be a suitable configuration of the auditing node 102. As noted above, the auditing node 102 may be configured to perform each of the functions as a consensus node 106. As such, consensus nodes 106 may include components of the auditing node 102 that are used in performing functions associated therewith.

The auditing node 102 may include a receiving device 202. The receiving device 202 may be configured to receive data over one or more networks via one or more network protocols. The receiving device 202 may be configured to receive data from auditing nodes 104 and other devices and systems via suitable communication networks and corresponding network protocols. In some embodiments, the receiving device 202 may be comprised of multiple devices, such as different receiving devices for receiving data over different networks, such as a first receiving device for receiving data over a local area network and a second receiving device for receiving data via a permissioned blockchain network. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other nodes in a permissioned blockchain network, including application or member nodes, consensus nodes 106, auditing nodes 104, etc. Data signals received by the receiving device 202 may be superimposed or otherwise encoded with transaction messages, proposal messages, proposal messages, prepare messages, prepare response messages, accept messages, confirmation messages, recovery messages, and recovery response messages. The receiving device 202 may also be configured to receive data signals superimposed or otherwise encoded with additional data for use in performing functions associated with operation as a node in a permissioned blockchain network, such as permission updates, hashing algorithms, public keys, bloom filter specifications, etc.

The auditing node 102 may also include a communication module 204. The communication module 204 may be configured to transmit data between modules, engines, databases, memories, and other components of the auditing node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the auditing node 102 and external components of the auditing node 102, such as externally connected databases, display devices, input devices, etc. The auditing node 102 may also include a processing device. The processing device may be configured to perform the functions of the auditing node 102 discussed herein as will be apparent to persons having skill in the relevant art. In some embodiments, the processing device may include and/or be comprised of a plurality of engines and/or modules specially configured to perform one or more functions of the processing device, such as a querying module 210, hashing module 212, generation module 214, data identification module 218, verification module 220, etc. As used herein, the term "module" may be software or hardware particularly programmed to receive an input, perform one or more processes using the input, and provide an output. The input, output, and processes performed by various modules will be apparent to one skilled in the art based upon the present disclosure.

The auditing node 102 may include a transaction database 206. The transaction database 206 may be configured to store a plurality of transaction messages 208 using a suitable data storage format and schema. The transaction database 206 may be a relational database that utilizes structured query language for the storage, identification, modifying, updating, accessing, etc. of structured data sets stored therein. Each transaction message 208 may be a structured data set configured to store data related to a transaction to be added to the permissioned blockchain. Each transaction message 208 may include, for example, a slot identifier associated with a slot to which the related transaction corresponds, and a transaction value. The transaction value may be a transaction reference, or a transaction record or other data used in the generation of a transaction reference by the auditing node 102.

The transaction database 206, or other data storage in the auditing node 102 (e.g., the memory 222, discussed in more detail below) may also be configured to store list of unconfirmed transactions. Lists of unconfirmed transactions may be lists that are associated with a slot (e.g., via a corresponding slot identifier) that include transaction references for transactions to be added to the permissioned blockchain. In some instances, a consensus map may be stored in the transaction database 206 with a corresponding list of unconfirmed transactions, which may include Merkle roots generated by the auditing node 102 and received from consensus nodes 106 for the corresponding list of unconfirmed transactions.

The auditing node 102 may include a querying module 210. The querying module 210 may be configured to execute queries on databases to identify information. The querying module 210 may receive one or more data values or query strings, and may execute a query string based thereon on an indicated database, such as the transaction database 206, to identify information stored therein. The querying module 210 may then output the identified information to an appropriate engine or module of the auditing node 102 as necessary. The querying module 210 may, for example, execute a query on the transaction database 206 to insert transaction messages 208 upon receipt by the receiving device 202. The querying module 210 may also be configured to, for instance, execute queries to update lists of unconfirmed transactions, identify transaction values for inclusion in a new block, and clear consensus maps and unconfirmed transactions for confirmed slots.

The auditing node 102 may also include a hashing module 212. The hashing module 212 may be configured to generate hash values for data via the application of one or more hashing algorithms thereto. The hashing module 212 may receive data as input, may generate a hash value via application of hashing algorithms to the data, and may output the generated hash value to another module or engine of the auditing node 102. In some instances, the hashing module 212 may also receive the hashing algorithm(s) as input. In other instances, the hashing module 212 may be configured to identify (e.g., via queries on the memory 222 by the querying module 210) hashing algorithms for use in generating hash values. The hashing module 212 may be configured to generate hash values for block headers in the permissioned blockchain, generate block hashes of temporary block headers, generate transaction references for transaction values, generate Merkle roots for lists of unconfirmed transactions, generate digital signatures for use as proposal numbers, hash transaction references for use in bloom filters, and generate any other hash values suitable for performing the functions of the auditing node 102 as discussed herein.

The auditing node 102 may also include a generation module 214. The generation module 214 may be configured to generate data and data messages for use in performing the functions of the auditing node 102 as discussed herein. The generation module 214 may receive a request, may generate a data message or data based on that request, and may output the generated data or message to another module or engine of the auditing node 102. For example, the generation module 214 may be configured to generate proposal messages, prepare messages, prepare response messages, accept messages, confirmation messages, recovery messages, and recovery response messages. The generation module 214 may also be configured to generate temporary block headers, new block headers, new blocks, and may be configured to write new blocks to the permissioned blockchain (e.g., directly or via the generation and submission of queries to the querying module 210). The generation module 214 may also be configured to generate bloom filters in conjunction with the hashing module 212 for use in the recovery of the auditing node 102 when desynchronized. In some cases, the generation module 214 may be configured to generate timestamps, which may be represented in any suitable format.

The auditing node 102 may also include a data identification module 218. The data identification module 218 may be configured to receive one or more data values as input, may identify data based on the input data values, and may output the identified data to another module or engine of the auditing node 102. The data identification module 218 may, for example, be configured to identify the ordering of transaction references for use in the generation of Merkle roots based thereon, and the ordering of proposal numbers as well as the identification of a highest (or other suitable criteria for consensus) proposal number for a consensus audit. The data identification module 218 may also be configured to input transaction references in a bloom filter to identify transaction references that are not included in a bloom filter for removal (e.g., via a query executed by the querying module 210) from a corresponding list of unconfirmed transactions.

The auditing node 102 may also include a verification module 220. The verification module 220 may be configured to receive data values as input, may verify the input data values, and may output a result of the verification to another module or engine of the auditing node 102. The verification module 220 may, for example, verify data included in a confirmation message received from an auditing node 104 or consensus node 106, such as by confirmed that a block hash generated by the hashing module 212 for a block header matches the block hash included in a confirmation message received by the receiving device 202. The verification module 220 may also be configured to verify equivalence among Merkle roots, such as to identify if the auditing node 102 or a neighboring consensus node 106 or auditing node 104 is out of synchronization.

The auditing node 102 may also include a transmitting device 216. The transmitting device 216 may be configured to transmit data over one or more networks via one or more network protocols. The transmitting device 216 may be configured to transmit data to auditing nodes 104, and other entities via suitable communication networks and corresponding network protocols. In some embodiments, the transmitting device 216 may be comprised of multiple devices, such as different transmitting devices for transmitting data over different networks, such as a first transmitting device for transmitting data over a local area network and a second transmitting device for transmitting data via a permissioned blockchain network. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to other nodes in the permissioned blockchain network, such as auditing nodes 104, consensus nodes 106, application or member nodes, etc. Data signals electronically transmitted by the transmitting device 216 may be superimposed or otherwise encoded with data messages used in performing the functions of the auditing node 102 discussed herein, such as proposal messages, prepare messages, prepare response messages, accept messages, confirmation messages, recovery messages, and recovery response messages. The transmitting device 216 may also be configured to electronically transmit data signals superimposed or otherwise encoded with other data that may be used in performing the functions of the auditing node 102, such as hashing algorithms, bloom filter specifications, public keys, etc.

The auditing node 102 may also include a memory 222. The memory 222 may be configured to store data for use by the auditing node 102 in performing the functions discussed herein. The memory 222 may be configured to store data using suitable data formatting methods and schema and may be any suitable type of memory, such as read-only memory, random access memory, etc. The memory 222 may include, for example, lists of unconfirmed transactions, consensus delay times, consensus maps, encryption keys and algorithms, communication protocols and standards, data formatting standards and protocols, program code for modules and application programs of the processing device, and other data that may be suitable for use by the auditing node 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

Consensus Proposal

Figure 3:
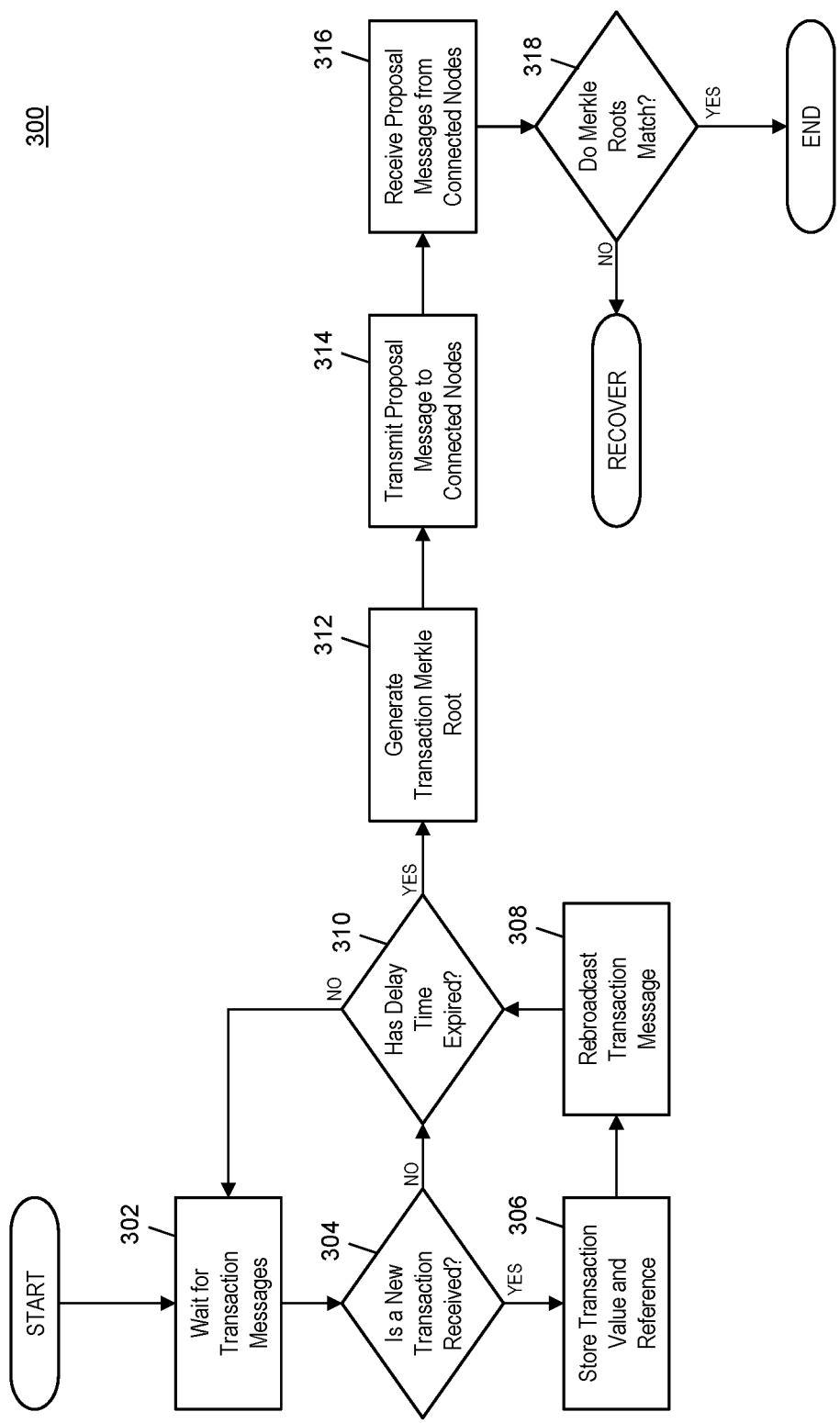
FIG. 3 is a flow diagram illustrating a process for identifying a consensus proposal in a consensus node of a permissioned blockchain network in accordance with exemplary embodiments.

FIG. 3 illustrates a process 300 for consensus proposal in the efficient consensus of new transactions to be added to the permissioned blockchain network illustrated in FIG. 1 and discussed above.

In step 302, the auditing node 102 may wait to receive transaction messages from application or member nodes, consensus nodes 106, or other nodes in the permissioned blockchain network configured to submit transactions for inclusion in the permissioned blockchain. In step 304, the auditing node 102 may identify if a new transaction message is received. A new transaction message may be a transaction message whose included transaction value and/or corresponding transaction reference are not already included in the list of unconfirmed transactions. In instances where slots may be used, the transaction message may be new if the corresponding transaction reference is not included in the list of unconfirmed transaction references for that slot.

If a new transaction message is received, then, in step 306, the hashing module 212 of the auditing node 102 may generate a transaction reference for the transaction, if applicable, and the querying module 210 of the auditing node 102 may execute queries to store the transaction reference in the list of unconfirmed transactions for the corresponding slot and store the transaction value for later inclusion into a block. In step 308, the transmitting device 216 of the auditing node 102 may rebroadcast the transaction message to each of its neighboring consensus nodes 106. Once the transaction message has been rebroadcast, or directly after the determination in step 304 if the transaction message is not new (e.g., and thus is not stored again and rebroadcast), then, in step 310, the auditing node 102 may determine if the consensus delay time has expired. The determination may be based on a consensus delay time, such as may be stored in the memory 222 of the auditing node 102, and a timestamp. The timestamp may be generated by the generation module 214 and may be a timestamp of the first receipt of a transaction message for a slot, the receipt of the latest transaction message to be received for the slot, or other suitable time.

If the consensus delay time has not yet expired, then the process 300 may return to step 302 where the auditing node 102 may continue to wait for new transaction messages to be received until such a time that the consensus delay time has expired. Upon expiration of the consensus delay time, then, in step 312, the hashing module 212 of the auditing node 102 may generate a Merkle root of the list of unconfirmed transactions, which may include only those unconfirmed transaction associated with a specific slot, if applicable. The Merkle root may be generated via the hashing of pairs of transaction references and subsequent hashing of the hash results until a root node of a corresponding Merkle tree is identified. In some instances, the data identification module 218 of the auditing node 102 may identify an order for the list of unconfirmed transactions prior to the generation of the Merkle root, which may be a natural ordering of the transaction references, such as an ascending numerical order.

In step 314, the generation module 214 of the auditing node 102 may generate a proposal message, which may be electronically transmitted by the transmitting device 216 of the auditing node 102 to each of the neighboring consensus nodes 106 (e.g., including any neighboring auditing nodes 104 performing the functions of a consensus node 106). The proposal message may include the generated Merkle root and, if applicable, the slot identifier for the associated slot. In step 316, the receiving device 202 of the auditing node 102 may receive proposal messages from each of the neighboring consensus nodes 106, which may include the same slot identifier, if applicable, and the Merkle root generated by the respective consensus nodes 106 from their own list of unconfirmed transactions.

In step 318, the verification module 220 of the auditing node 102 may perform a verification to determine if the Merkle root generated by the generation module 214 therein matches a majority of the Merkle roots included in the proposal messages received from the neighboring consensus nodes 106. If there is a match to the received Merkle roots, then the process 300 may be completed and the consensus proposal process finished for the auditing node 102. If there is not a match, then the auditing node 102 may be desynchronized and may instead enter a recovery process, such as the process illustrated in FIGS. 4A, 4B, and 5, discussed in more detail below, to resynchronize.

Node Desynchronization Recovery

Figure 4A:
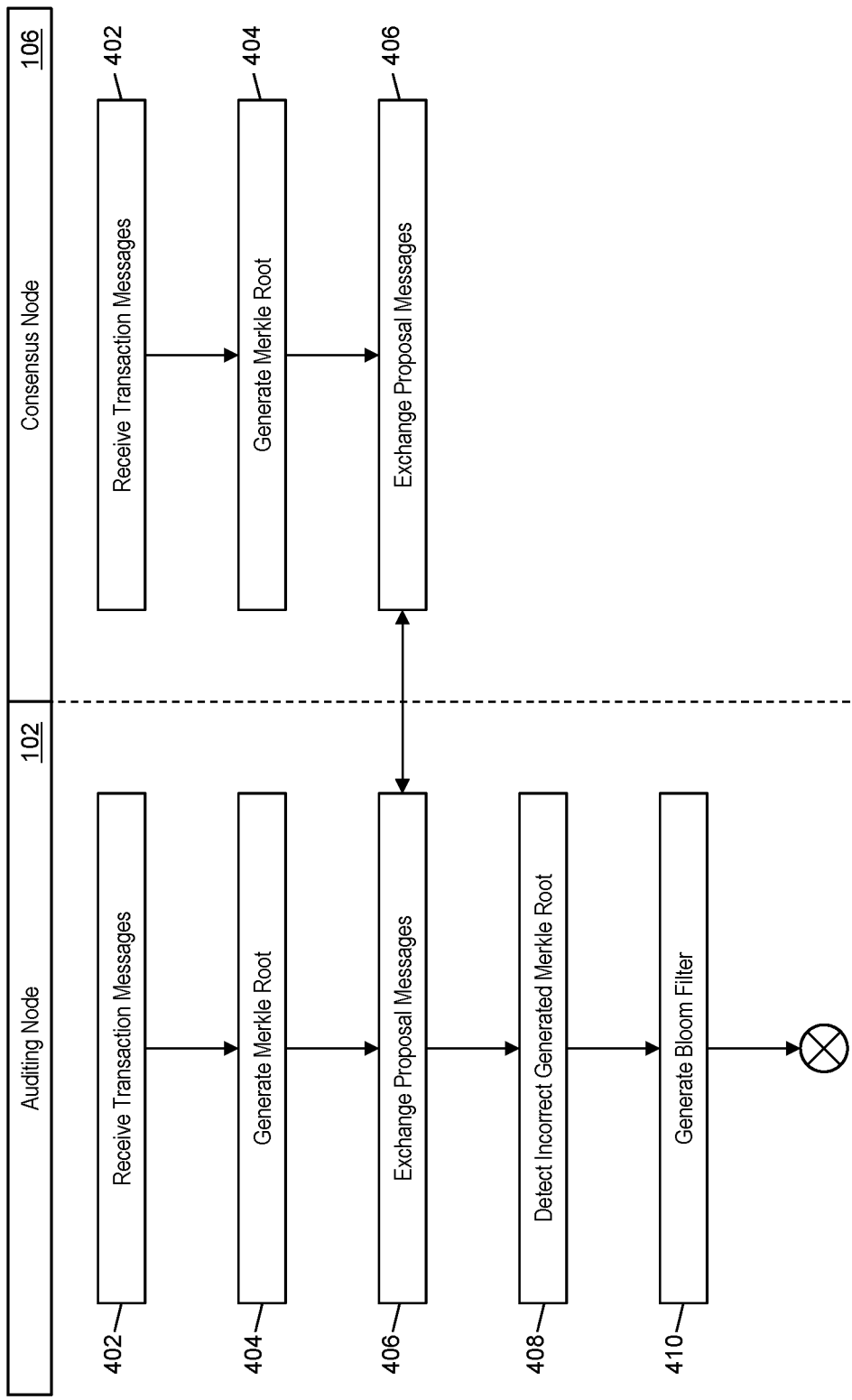
FIGS. 4A and 4B are a flow diagram illustrating a process for the recovery of a desynchronized consensus node in a permissioned blockchain network via the use of a bloom filter in the system of FIG. 1 in accordance with exemplary embodiments.
Figure 4B:
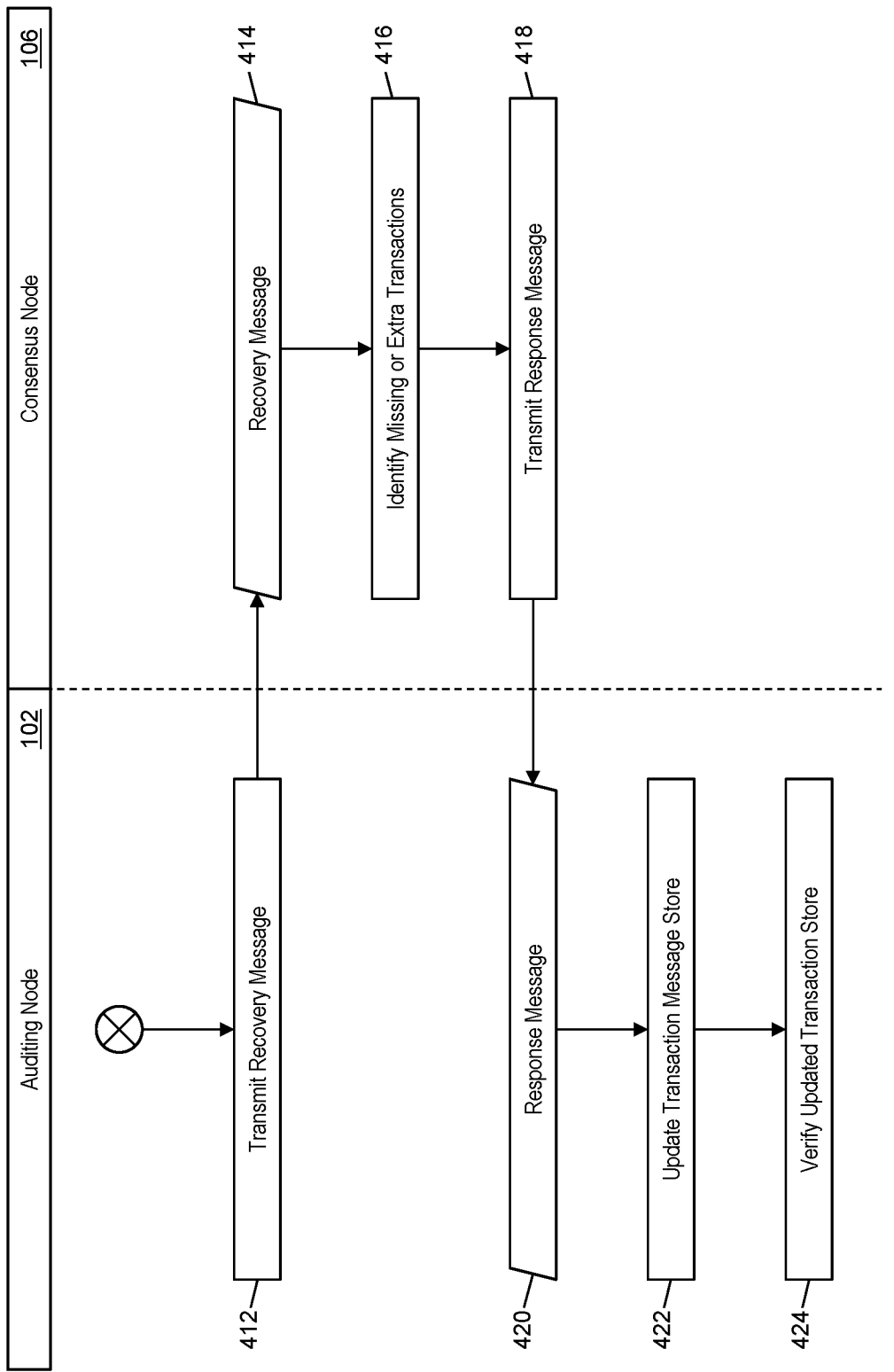

FIGS. 4A and 4B illustrate a process for the recovery of the auditing node 102 or other node in the permissioned blockchain network that is out of synchronization, such as may be identified in step 318 of the process 300 illustrated in FIG. 3 and discussed above.

In step 402, the auditing node 102 and a neighboring consensus node 106 may both receive transaction messages for transactions that are to be added to the permissioned blockchain. Each of the transaction messages may include a slot identifier and a transaction value, where the hashing module 212 of the respective node may generate a transaction reference based on the transaction value, if applicable, where the transaction reference is stored in a list of unconfirmed transactions for the corresponding slot. In step 404, the hashing module 212 for each of the respective nodes may generate a Merkle root using the list of unconfirmed transactions. In some instances, both nodes may order the list of unconfirmed transactions prior to generation of the Merkle root.

In step 406, the auditing node 102 and neighboring consensus node 106 may exchange proposal messages, where each proposal message may include the slot identifier and the Merkle root generated by the respective node. In step 408, the verification module 220 of the auditing node 102 may detect that the Merkle root generated by the hashing module 212 of the auditing node 102 is incorrect in that it does not match the Merkle root generated by the neighboring consensus node 106 or a majority of the consensus nodes 106 neighboring the auditing node 102 that provided a proposal message. The lack of a match may thus indicate that the auditing node 102 is missing at least one transaction reference from its list of unconfirmed transactions, or may include extra transaction references that should not be in the list of unconfirmed transactions.

In step 410, the generation module 214 of the auditing node 102 may generate a bloom filter using the list of unconfirmed transactions. The bloom filter may be of a size that is at least double the number of unconfirmed transactions in the list for the slot, and may be generated using a predetermined number of hash rounds using one or more hashing algorithms. In step 412, the generation module 214 may generate a recovery message that includes at least the slot identifier, the generated bloom filter, the size of the bloom filter, the number of hash rounds used in the generation of the bloom filter, and the number of unconfirmed transactions in the node's list of unconfirmed transactions for that slot, which may then be electronically transmitted to the neighboring consensus node 106 via the transmitting device 216 of the auditing node 102. In step 414, the consensus node's receiving device may receive the recovery message.

In step 416, the consensus node 106 may identify if transactions are missing from the node's list of unconfirmed transactions or if the node's list includes extra unconfirmed transactions. The determination may be based on a comparison of the number of unconfirmed transactions included in the recovery message and a number of unconfirmed transactions in the consensus node's own list for the slot. If the consensus node 106 determines that the auditing node 102 is missing transactions, the consensus node 106 may identify transaction references not included in the node's list by applying the transaction references in the consensus node's list in the bloom filter included in the recovery message. Transaction messages whose references are not included in the bloom filter may be placed into a recovery response message generated by the consensus node 106. If the consensus node 106 determines that the auditing node 102 has extra transactions, then the consensus node 106 may generate its own bloom filter using its own list of unconfirmed transactions, which may use the same specifications as the bloom filter included in the recovery message, or may be different. The consensus node 106 may then generate a recovery response message that includes the new bloom filter and its specifications.

In step 418, the consensus node 106 may electronically transmit the recovery response message to the auditing node 102. In step 420, the receiving device 202 of the auditing node 102 may receive the recovery response message, which may include the slot identifier and the additional transaction messages or the bloom filter and specifications, as applicable. In step 422, the auditing node 102 may update their list of unconfirmed transactions accordingly. As discussed in more detail below, the auditing node 102 may add transaction references for newly received transaction messages in its list of unconfirmed transactions, or may use the bloom filter provided by the consensus node 106 to identify transaction references for removal from the list of unconfirmed transactions. In step 424, the verification module 220 of the auditing node 102 may verify the updated list of unconfirmed transactions by checking a new Merkle root for the unconfirmed transactions generated via the hashing module 212 of the auditing node 102 against the Merkle roots received from the neighboring consensus node 106 and other neighboring nodes. In instances where the verification may be unsuccessful, the auditing node 102 may repeat the process from step 410 for further recovery of its list of unconfirmed transactions.

Figure 5:
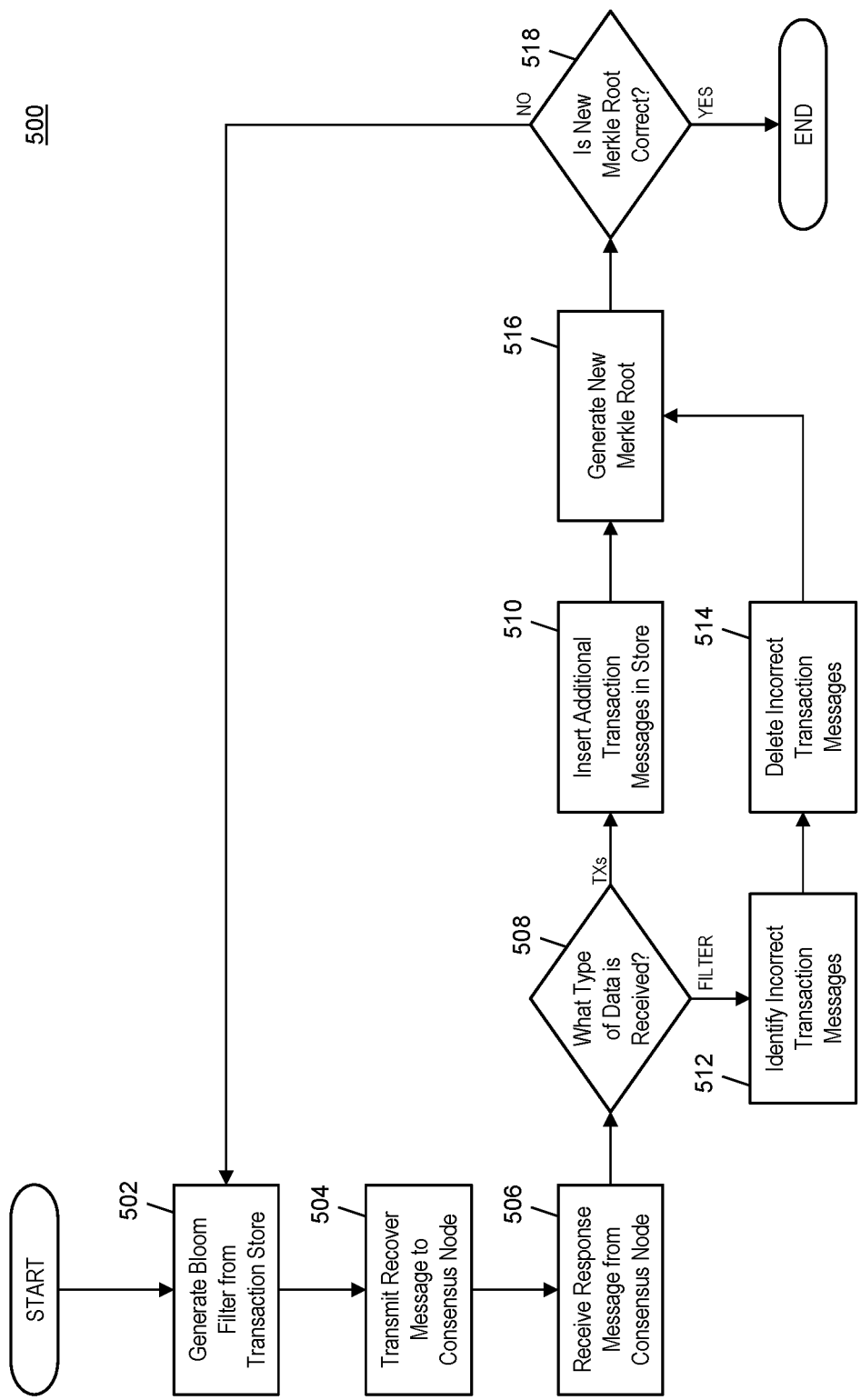
FIG. 5 is a flow diagram illustrating a process for resynchronization in a desynchronized consensus node in a permissioned blockchain network in accordance with exemplary embodiments.

FIG. 5 illustrates a process 500 for the recovery of a desynchronized list of unconfirmed transactions in the auditing node 102, such as may occur in the process illustrated in FIGS. 4A and 4B and discussed above.

In step 502, the generation module 214 may generate a bloom filter from a list of unconfirmed transactions for a given slot identifier that the auditing node 102 has determined is out of synchronization with other consensus nodes 106 in the permissioned blockchain network. The bloom filter may be of a size that is at least double a count of the unconfirmed transactions in the list and may be generated by passing the transaction references in the list of unconfirmed transactions through a predetermined number of hash rounds using one or more hashing algorithms. The generation module 214 may generate a recovery message that includes the slot identifier, the bloom filter, the size of the bloom filter, the count of unconfirmed transactions in the node's list for the slot, and the number of hash rounds. If applicable, the recovery message may also include information regarding the hashing algorithm or algorithms used in the hash rounds.

In step 504, the transmitting device 216 of the auditing node 102 may electronically transmit the generated recovery message to a neighboring consensus node 106 that had provided a correct Merkle root in its proposal message, as may be determined by the Merkle roots included in each of the proposal messages. In step 506, the receiving device 202 of the auditing node 102 may receive a recovery response message from the neighboring consensus node 106 in response to the recovery message, which may include at least a slot identifier and additional data. In step 508, the data identification module 218 may identify the type of additional data included in the recovery response message.

If the recovery response message includes transaction messages, then the process 500 may proceed to step 510, where the list of unconfirmed transactions for the slot may be updated based on the transaction messages. The hashing module 212 of the auditing node 102 may generate transaction references for each of the transaction messages via the application of one or more hashing algorithms to the transaction value included in each of the transactions messages, and the querying module 210 of the auditing node 102 may execute a first query on the transaction database 206 to store the transaction messages 208 in a data store associated with the slot and a second query on the memory 222 or other suitable data storage to add the transaction references to the list of unconfirmed transactions.

If the recovery response message includes a bloom filter, then the process 500 may proceed to step 512. In step 512, the data identification module 218 or other suitable module or engine of the auditing node 102 may apply the transaction references in its list of unconfirmed transactions to the bloom filter included in the recovery response message, noting the provided size of the bloom filter and number of hash rounds, to identify transaction references not included in the bloom filter (e.g., and thus not included in the consensus node's list of unconfirmed transactions) and are thus incorrect transaction references. In step 514, the querying module 210 of the auditing node 102 may execute queries on the transaction database 206 and other memory 222 of the auditing node 102 to remove the identified incorrect transaction references from the list of unconfirmed transactions and their corresponding transaction messages 208.

Once the auditing node 102 has completed the removal or addition of transaction references and transaction messages based on the recovery response message, then, in step 516, the hashing module 212 of the auditing node 102 may generate a new Merkle root for the slot using the updated list of unconfirmed transactions. In instances where generation of the Merkle root includes the ordering of the transaction references, the data identification module 218 may update the ordering of the updated list of transaction references to account for any changes necessitated by the addition or removal of transaction references. In step 518, the verification module 220 of the auditing node 102 may determine if the new Merkle root is correct. The determination may be based on an evaluation of the new Merkle root when compared to the Merkle root included in the proposal message from the neighboring consensus node 106 that participated in the recovery and/or other neighboring consensus nodes. If the new Merkle root is correct, the process 500 may be completed and the auditing node 102 back in synchronization. If the new Merkle root is not correct, then the process 500 may return to step 502 and repeated for the updated list of transaction references. In such an instance, the process 500 may continue to be repeated until the auditing node 102 generates a correct Merkle root and is thus back in synchronization with the permissioned blockchain network.

Consensus Audit

Figure 6:
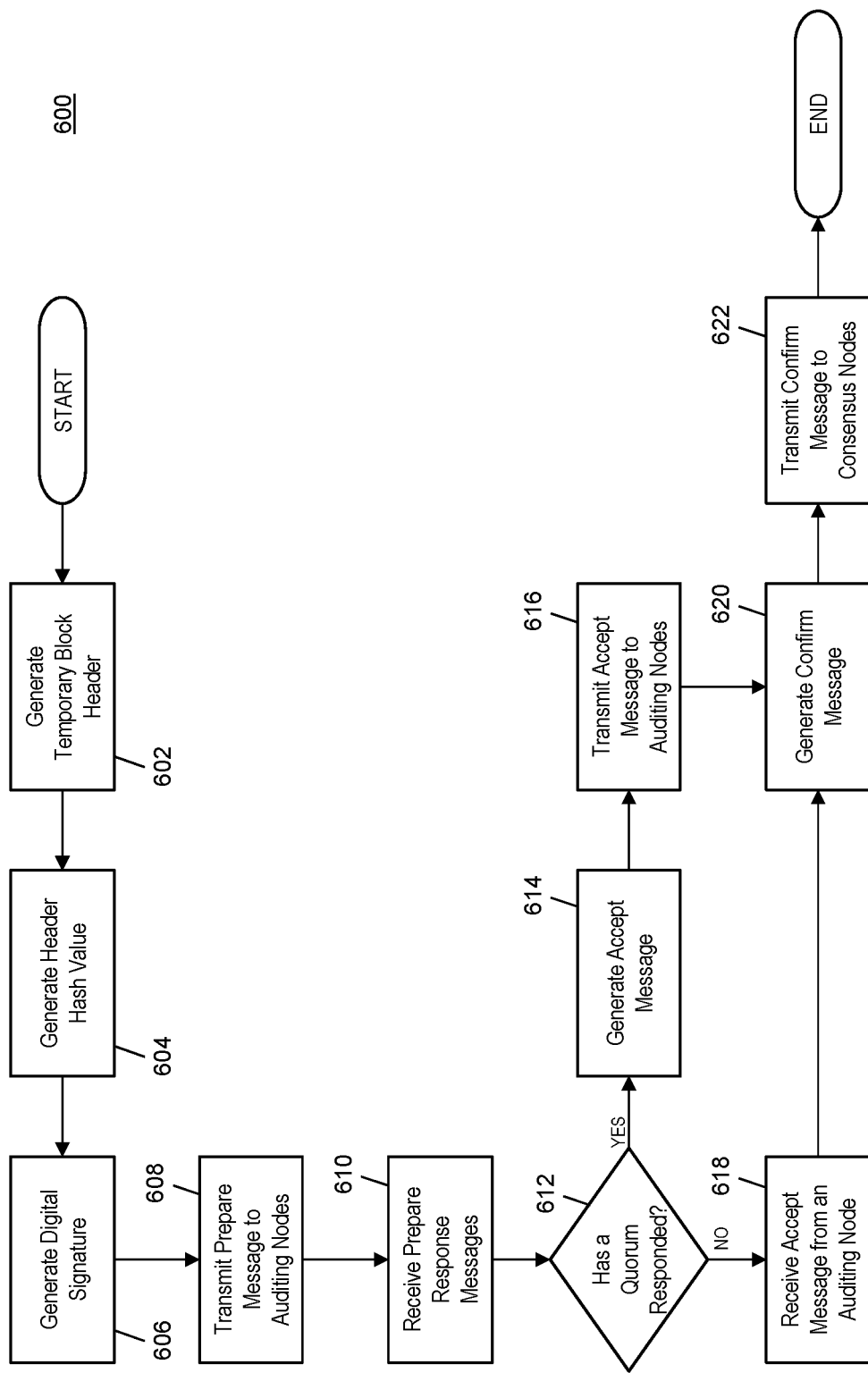
FIG. 6 is a flow chart illustrating a process for the performing of a consensus audit in auditing nodes in a permissioned blockchain network for efficient consensus of a new block in accordance with exemplary embodiments.

FIG. 6 illustrates a process 600 for the performing of the consensus audit in the consensus mechanism of the permissioned blockchain network for the consensus of new transactions to be added to the permissioned blockchain.

In step 602, the generation module 214 of the auditing node 102 may generate a temporary block header for a potential new block to be added to the permissioned blockchain for a specific set of unconfirmed transactions, such as those associated with a specific slot. The temporary block header may include at least a hash value of the header of the block most recently added to the permissioned blockchain and the Merkle root generated for the list of unconfirmed transactions. In some instances, the temporary block header may also include a slot identifier, public key associated with the auditing node 102, nonce, version identifier, or other data that will be included in the eventual header used for the new block.

In step 604, the hashing module 212 of the auditing node 102 may generate the hash block of the temporary block header via application of one or more predetermined hashing algorithms to the temporary block header. In step 606, the generation module 214 of the auditing node 102 may generate a digital signature as a proposal number for the consensus audit. The digital signature may be generated based on the block hash and may be generated using a public key associated with the auditing node 102. In instances where the public key is used, it may be the same public key included in the temporary block header prior to generation of the hash block.

In step 608, the generation module 214 of the auditing node 102 may generate a prepare message that may be electronically transmitted by the transmitting device 216 of the auditing node 102 to the other auditing nodes 104 in the permissioned blockchain network. The prepare message may include at least the block hash and proposal number, and may also include the public key used in generation of the proposal number, the slot identifier, and the nonce included in the temporary block header, if applicable. In step 610, the receiving device 202 of the auditing node 102 may receive prepare response messages from the other auditing nodes 104 in the permissioned blockchain network. Prepare response messages, if received, may include the slot identifier and the proposal number provided by the auditing node 102 has higher than the auditing node's own proposal number, and may also include data associated with an earlier accepted proposal, if applicable, such as the accepted proposal number, block hash, public key, and nonce.

In step 612, the data identification module 218 of the auditing node 102 may determine if a quorum of the auditing nodes 106 in the permissioned blockchain network have responded to the node's prepare message with a prepare response message. If a quorum have responded with a prepare response message, then, in step 614, the generation module 214 of the auditing node 102 may generate an accept message. The accept message may include the same data included in the node's prepare message, but formatted or otherwise identified as being an accept message. In step 616, the transmitting device 216 of the auditing node 102 may electronically transmit the accept message to the other auditing nodes 104 in the permissioned blockchain network.

If, in step 612, the auditing node 102 determines that a quorum of the auditing nodes 104 have not responded with prepare response messages, then, in step 618, the receiving device 202 of the auditing node 102 may await receipt of an accept message from another auditing node 104. In such an instance, the auditing node 102 would not have generated the highest proposal number, and would wait for identification thereof by the auditing nodes 104. In such instances, the process 600 may further include the receipt of a prepare message from another auditing node 104 that includes a higher proposal number, and response thereto by the auditing node 102 with its own prepare response message, acknowledging the higher proposal number. In such a case, the accept message would be received from the auditing node 104 to which the auditing node 102 sent the prepare response message.

Once an accept message has either been generated and distributed by the auditing node 102 or received by the auditing node 102, then, in step 620, the generation module 214 of the auditing node 102 may generate a confirm message. The confirm message may be part of the consensus confirmation in the permissioned blockchain network and may include at least the slot identifier for the slot being confirmed, the block hash, the digital signature that was the highest proposal number with its public key, if applicable, and the nonce included in the accept message, if applicable. In step 622, the transmitting device 216 of the auditing node 102 may electronically transmit the confirm message to each of its neighboring consensus nodes 106, which may in turn rebroadcast the confirm message to its own neighboring consensus nodes 106 for propagation of the confirm message throughout the permissioned blockchain network.

Consensus Confirmation

Figure 7:
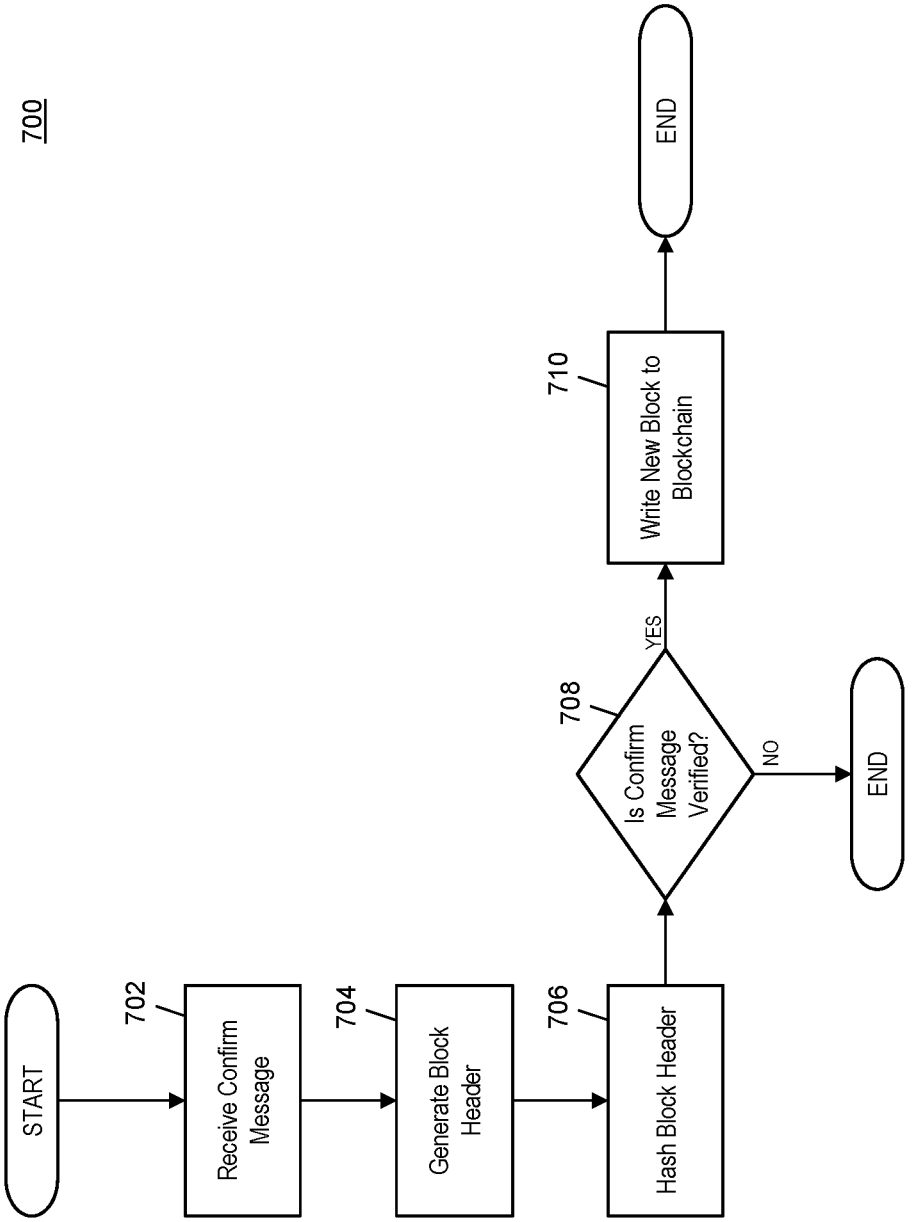
FIG. 7 is a flow chart illustrating a process for the verification and adding of a new block to a permissioned blockchain as a result of an efficient consensus mechanism in accordance with exemplary embodiments.

FIG. 7 illustrates a process 700 for consensus confirmation as executed by the auditing node 102 or another consensus node 106 in the permissioned blockchain network for the confirmation that a consensus has been reached and the subsequent writing of an associated new block to the permissioned blockchain.

In step 702, the receiving device 202 of the auditing node 102 may receive a confirm message. In instances where the auditing node 102 may be an auditing node 104, the confirm message may be received internally in the auditing node 102 as generated by the generation module 214, such as in step 620 of the process 600 illustrated in FIG. 6 and discussed above. The confirm message may include at least a slot identifier associated with the slot being confirmed, a block hash of the temporary block header for the eventual new block, a digital signature, the public key used in the generation of the digital signature, and a nonce, if applicable.

In step 704, the generation module 214 of the auditing node 102 may generate a block header for the new block. The block header may include the same data included in the temporary block header that was hashed to generate the hash block included in the confirm message, which may be the same data included in the confirm message aside from the signature and block hash, in addition to the Merkle root generated by the auditing node 102 during the consensus proposal. In step 706, the hashing module 212 may generate a hash value via application of the one or more hashing algorithms used in generation of the hash block to the generated block header.

In step 708, the verification module 220 of the auditing node 102 may verify the confirm message. The confirm message may be verified based on a comparison of the hash value generated for the block header by the auditing node 102 in step 706 and the block hash included in the confirm message. If the hash value does not match the hash block, then the verification may be unsuccessful and the consensus confirmation ended, as it may indicate that the auditing node used an incorrect Merkle root and is out of synchronization, that the auditing node 102 is itself out of synchronization and has an incorrect Merkle root, or that the data included in the confirm message or auditing node 102 has otherwise become compromised. If the verification is successful, with the hash value matching the block hash, then, in step 710, the querying module 210 of the auditing node 102 may execute a query to write a new block for the slot to the permissioned blockchain. The new block may include the transaction values for each of the unconfirmed transactions associated with the slot and the block header, which may be the block header generated in step 704 and further including the digital signature.

Exemplary Method for Adding a Block to a Permissioned Blockchain

Figure 8:
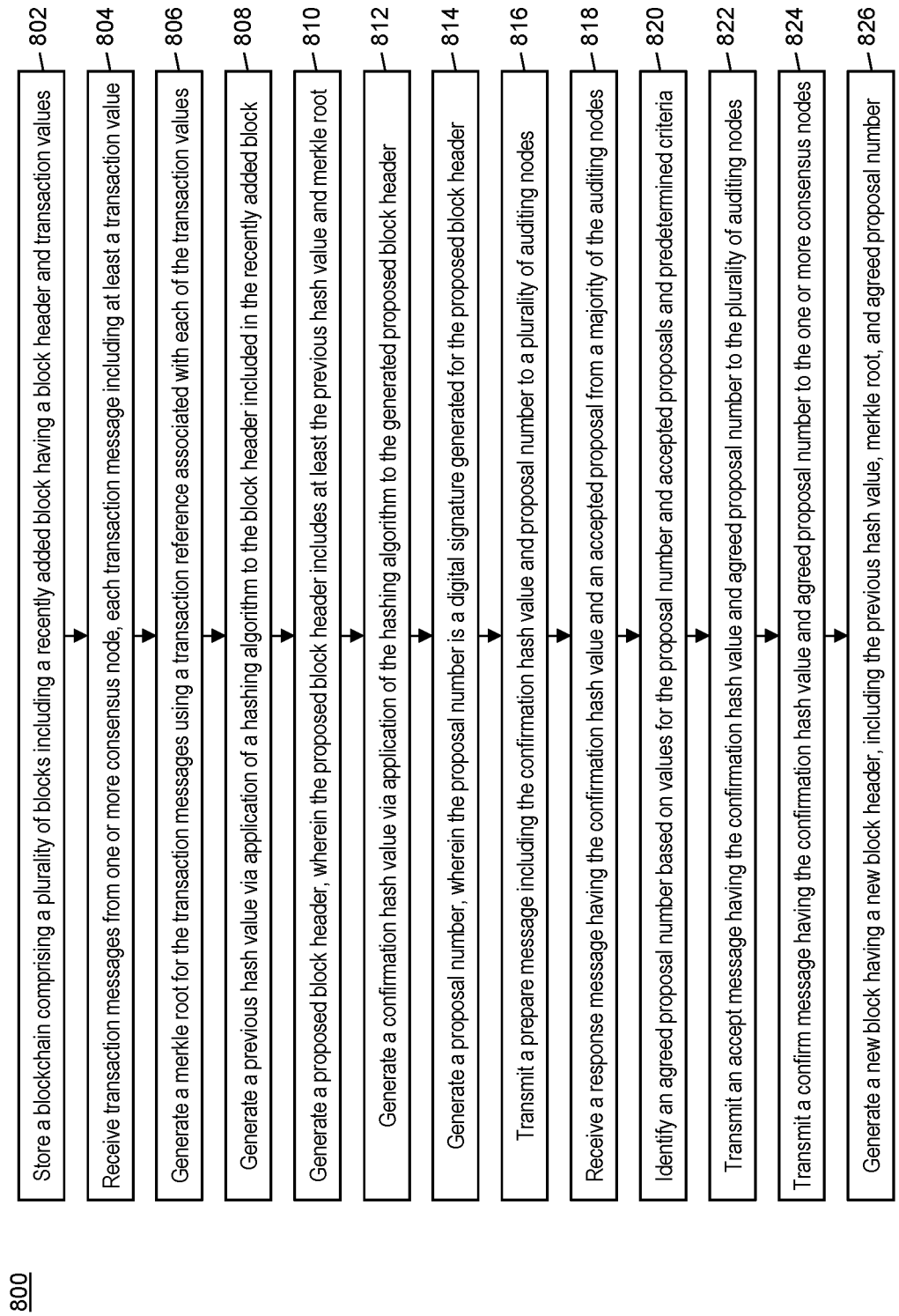
FIG. 8 is a flow chart illustrating an exemplary method for adding a block to a permissioned blockchain using an efficient consensus mechanism in accordance with exemplary embodiments.

FIG. 8 illustrates a method 800 for the adding of a block to a permissioned blockchain following the use of an efficient consensus mechanism for the consensus thereof.

In step 802, a blockchain comprised of a plurality of blocks may be stored in a memory (e.g., the memory 222) of a processing server (e.g., the auditing node 102), wherein the plurality of blocks includes a recently added block that includes at least a block header and one or more transaction values. In step 804, a plurality of transaction messages may be received by a receiving device (e.g., the receiving device 202) of the processing server from one or more consensus nodes (e.g., consensus nodes 106) associated with the blockchain, wherein each transaction message includes at least a transaction value. In step 806, a Merkle root may be generated for the plurality of transaction messages by a hashing module (e.g., the hashing module 212) of the processing server using a transaction reference associated with the transaction value included in each of the plurality of transaction messages.

In step 808, a previous hash value may be generated by the hashing module of the processing server via application of a hashing algorithm to the block header included in the recently added block. In step 810, a proposed block header may be generated by a generation module (e.g., the generation module 214) of the processing server, wherein the proposed block header includes at least the previous hash value and the generated Merkle root. In step 812, a confirmation hash value may be generated by the hashing module of the processing server via application of the hashing algorithm to the generated proposed block header.

In step 814, a proposal number may be generated by the generation module of the processing server, wherein the proposal number is a numeric value of a digital signature generated for the generated proposed block header. In step 816, a prepare message may be electronically transmitted by a transmitting device (e.g., the transmitting device 216) of the processing server to a plurality of auditing nodes (e.g., auditing nodes 104) associated with the blockchain, wherein the prepare message includes at least the generated confirmation hash value and generated proposal number. In step 818, a response message may be received by the receiving device of the processing server from at least a majority of the plurality of auditing nodes, wherein each prepare response message includes at least the generated confirmation hash value and an accepted proposal number.

In step 820, an agreed proposal number may be identified by a data identification module (e.g., the data identification module 218) of the processing server based on the numeric value of the generated proposal number and a numeric value of the accepted proposal number included in each response message and a predetermined criteria. In step 822, an accept message may be electronically transmitted by the transmitting device of the processing server to the plurality of auditing nodes, wherein the accept message includes at least the generated confirmation hash value and the identified agreed proposal number. In step 824, a confirm message may be electronically transmitted by the transmitting device of the processing server to a plurality of consensus nodes associated with the blockchain, wherein the confirm message includes at least the generated confirmation hash value and the identified agreed proposal number. In step 826, a query may be executed on the memory by a querying module (e.g., the querying module 210) to add a new block to the blockchain, the new block including at least the transaction value included in each of the plurality of transaction messages a new block header including at least the previous hash value, the generated Merkle root, and the agreed proposal number.

In one embodiment, each of the plurality of transaction messages may further include a specific slot identifier, the proposed block header, prepare message, response message, accept message, confirm message, and new block header each may include the specific slot identifier, and the block header included in the recently added block may include a different slot identifier. In some embodiments, the transaction reference associated with the transaction value included in each of the plurality of transaction messages may be the transaction value. In one embodiment, the method 800 may also include generating, by the hashing module of the processing server, the transaction reference associated with the transaction value included in each of the plurality of transaction messages by hashing the respective transaction value using a predetermined hashing algorithm.

In some embodiments, the method 800 may further include storing, in the memory of the processing server, a consensus delay time, wherein each of the plurality of transaction messages further includes a common identification value associated with a time, and the Merkle root is generated after expiration of the consensus delay time after the time associated with the common identification value. In one embodiment, the method 800 may also include sorting, by the querying module of the processing server, the transaction reference associated with the transaction value included in each of the plurality of transaction messages based on a natural ordering prior to generating the Merkle root. In some embodiments, the method 800 may further include electronically transmitting, by the transmitting device of the processing server, a proposal message to the plurality of consensus nodes, wherein the proposal message includes at least the generated Merkle root.

In one embodiment, the method 800 may also include: receiving, by the receiving device of the processing server, a proposal message from each of the plurality of consensus nodes, wherein the proposal message includes at least a proposed Merkle root; and verifying, by a verification module (e.g., the verification module 220) of the processing server, that the generated Merkle root is equivalent to at least a majority of the proposed Merkle roots included in the received proposal messages. In some embodiments, the proposal number may be further generated using a nonce in combination with the digital signature, the prepare message may further include the nonce, each response message may further include an associated nonce, and the accept message, confirm message, and new block header may each further include the nonce associated with the agreed proposal number.

In one embodiment, the method 800 may also include storing, in the memory, a public key associated with the processing server, wherein the digital signature is generated for the proposed block header using the public key, the prepare message further includes the public key, each response message further includes an associated public key used in generation of the associated accepted proposal number, and the accept message, confirm message, and new block header further include the public key associated with the agreed proposal number. In some embodiments, the method 800 may further include sorting, by the querying module of the processing server, the generated proposal number and the accepted proposal number included in each response message based on the respective numeric value, wherein the agreed proposal number is identified based on the sorting and a predetermined criteria. In a further embodiment, the predetermined criteria may be selection of the highest numeric value.

Figure 9:
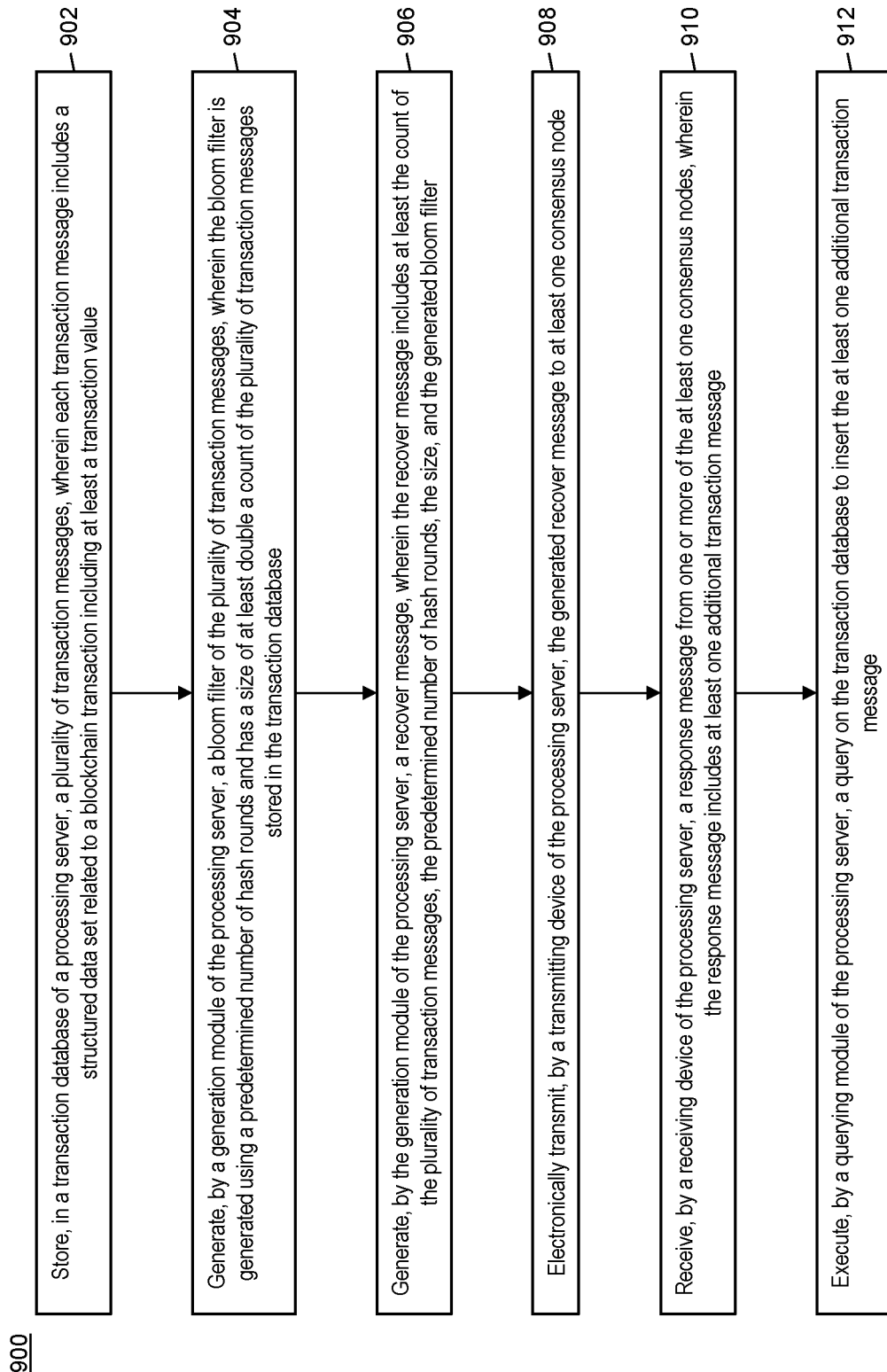
FIGS. 9 and 10 are flow charts illustrating exemplary methods for recovery of missing or extra data using a bloom filter in accordance with exemplary embodiments.

First Exemplary Method for Recovery of Missing or Extra Data Using a Bloom Filter FIG. 9 illustrates a method 900 for the recovery of missing unconfirmed transactions in node of a permissioned blockchain network that is out of synchronization.

In step 902, a plurality of transaction messages (e.g., transaction messages 208) may be stored in a transaction database (e.g., the transaction database 206) of a processing server (e.g., the auditing node 102), wherein each transaction message includes a structured data set related to a blockchain transaction including at least a transaction value. In step 904, a bloom filter of the plurality of transaction messages may be generated by a generation module (e.g., the generation module 214) of the processing server, wherein the bloom filter is generated using a predetermined number of hash rounds and has a size of at least double a count of the plurality of transaction messages stored in the transaction database.

In step 906, a recover message may be generated by the generation module of the processing server, wherein the recover message includes at least the count of the plurality of transaction messages, the predetermined number of hash rounds, the size, and the generated bloom filter. In step 908, the generated recover message may be electronically transmitted by a transmitting device (e.g., the transmitting device 216) of the processing server to at least one consensus node (e.g., consensus node 106).

In step 910, a response message may be received by a receiving device (e.g., the receiving device 202) of the processing server from one or more of the at least one consensus nodes, wherein the response message includes at least one additional transaction message. In step 912, a query may be executed on the transaction database by a querying module (e.g., the querying module 210) of the processing server to insert the at least one additional transaction message.

In one embodiment, the method 900 may also include: generating, by a hashing module (e.g., the hashing module 212) of the processing server, a Merkle root for the plurality of transaction messages using a transaction reference associated with the transaction value included in each of the plurality of transaction messages; receiving, by the receiving device of the processing server, a proposal message from each of the at least one consensus nodes, wherein the proposal message includes at least a proposed Merkle root; and verifying, by a verification module (e.g., the verification module 220) of the processing server, that the generated Merkle root is not equivalent to the proposed Merkle root included in each received proposal message prior to electronically transmitting the generated recover message. In a further embodiment, the method 900 may further include: generating, by the hashing module of the processing server, a new Merkle root for the plurality of transaction messages and the at least one additional transaction message using a transaction reference associated with the transaction value included in each respective transaction message; and verifying, by the verification module of the processing server, that the new Merkle root is equivalent to the proposed Merkle root included in each received proposal message.

In another further embodiment, the method 900 may also include generating, by the hashing module of the processing server, the transaction reference associated with the transaction value included in each of the plurality of transaction messages by hashing the respective transaction value using a predetermined hashing algorithm. In yet another further embodiment, the method 900 may further include sorting, by the querying module of the processing server, the transaction reference associated with the transaction value included in each of the plurality of transaction messages based on a natural ordering prior to generating the Merkle root.

In some embodiments, each of the plurality of transaction messages may further include a specific slot identifier, the recover message and response message may each further include the specific slot identifier, and each of the at least one additional transaction messages may include the specific slot identifier. In one embodiment, the bloom filter may be generated using a predetermined hashing algorithm for each of the predetermined number of hash rounds.

Figure 10:
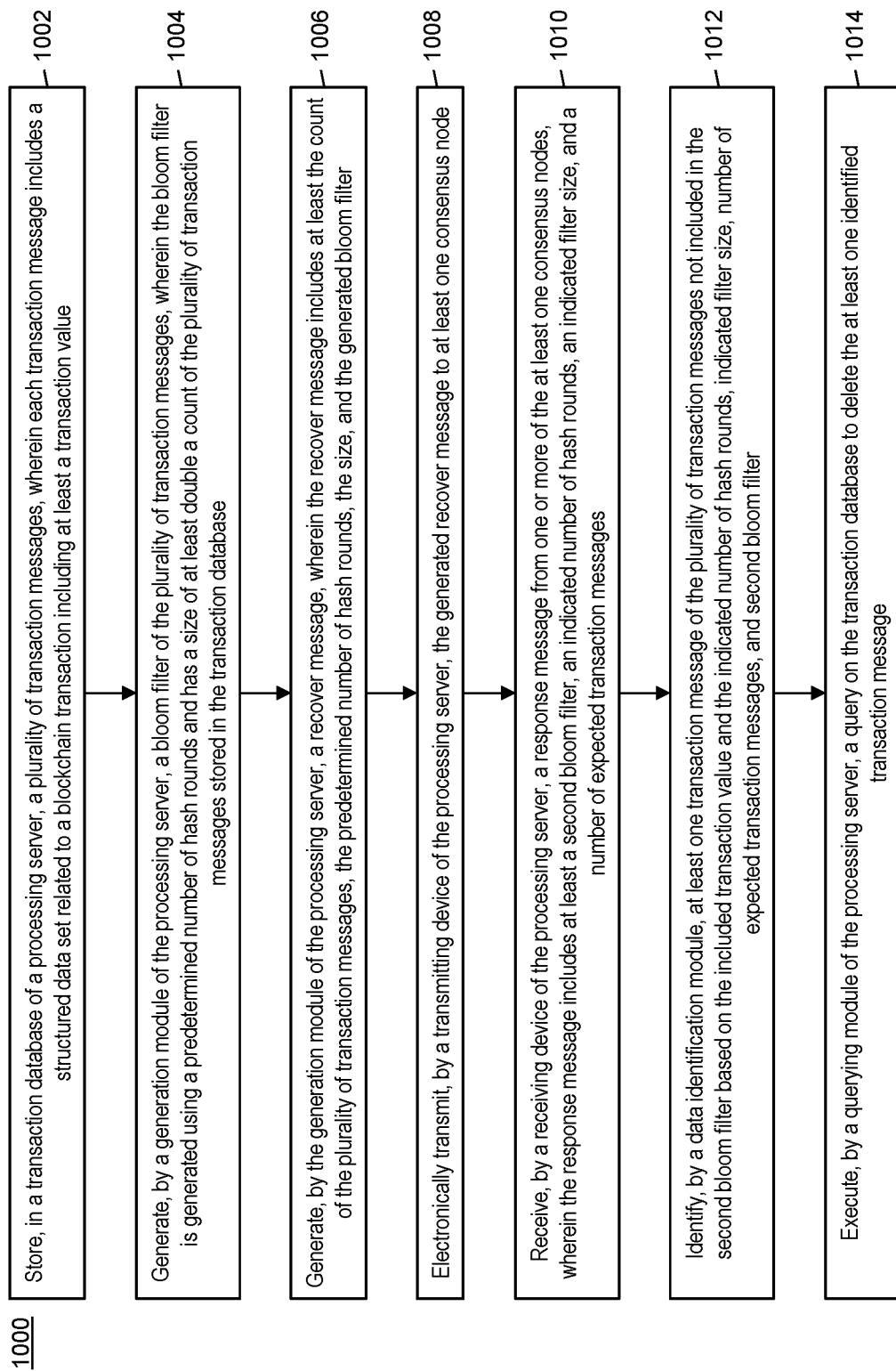

Second Exemplary Method for Recovery of Missing or Extra Data Using a Bloom Filter FIG. 10 illustrates a method 1000 for the recovery of extra data included in unconfirmed transactions in a node via the removal thereof using a bloom filter for unconfirmed transactions to be added to a permissioned blockchain.

In step 1002, a plurality of transaction messages (e.g., transaction messages 208) may be stored in a transaction database (e.g., the transaction database 206) of a processing server (e.g., the auditing node 102), wherein each transaction message includes a structured data set related to a blockchain transaction including at least a transaction value. In step 1004, a bloom filter of the plurality of transaction messages may be generated by a generation module (e.g., the generation module 214) of the processing server, wherein the bloom filter is generated using a predetermined number of hash rounds and has a size of at least double a count of the plurality of transaction messages stored in the transaction database.

In step 1006, a recover message may be generated by the generation module of the processing server, wherein the recover message includes at least the count of the plurality of transaction messages, the predetermined number of hash rounds, the size, and the generated bloom filter. In step 1008, the generated recover message may be electronically transmitted by a transmitting device (e.g., the transmitting device 216) of the processing server to at least one consensus node (e.g., consensus node 106).

In step 1010, a response message may be received by a receiving device (e.g., the receiving device 202) of the processing server from one or more of the at least one consensus nodes, wherein the response message includes at least a second bloom filter, an indicated number of hash rounds, an indicated filter size, and a number of expected transaction messages. In step 1012, at least one transaction message of the plurality of transaction messages not included in the second bloom filter may be identified by a data identification module (e.g., the data identification module 218) of the processing server based on the included transaction value and the indicated number of hash rounds, indicated filter size, number of expected transaction messages, and second bloom filter. In step 1014, a query may be executed on the transaction database by a querying module (e.g., the querying module 210) of the processing server to delete the at least one identified transaction message.

In one embodiment, the number of expected transaction messages may be less than the count of the plurality of transaction messages. In some embodiments, the indicated filter size may be at least double the number of expected transaction messages. In one embodiment, an updated count of the plurality of transaction messages after execution of the query may be equivalent to the number of expected transaction messages. In some embodiments, each of the plurality of transaction messages may further include a specific slot identifier, and the recover message and response message may each further include the specific slot identifier. In one embodiment, the bloom filter may be generated using a predetermined hashing algorithm for each of the predetermined number of hash rounds.

In some embodiments, the method 1000 may further include: generating, by a hashing module (e.g., the hashing module 212) of the processing server, a Merkle root for the plurality of transaction messages using a transaction reference associated with the transaction value included in each of the plurality of transaction messages; receiving, by the receiving device of the processing server, a proposal message from each of the at least one consensus nodes, wherein the proposal message includes at least a proposed Merkle root; and verifying, by a verification module (e.g., the verification module 220) of the processing server, that the generated Merkle root is not equivalent to the proposed Merkle root included in each received proposal message prior to electronically transmitting the generated recover message. In a further embodiment, the method 1000 may also include: generating, by the hashing module of the processing server, a new Merkle root for the plurality of transaction messages after deletion of the at least one identified transaction message using a transaction reference associated with the transaction value included in each respective transaction message; and verifying, by the verification module of the processing server, that the new Merkle root is equivalent to the proposed Merkle root included in each received proposal message.

In another further embodiment, the method 1000 may even further include generating, by the hashing module of the processing server, the transaction reference associated with the transaction value included in each of the plurality of transaction messages by hashing the respective transaction value using a predetermined hashing algorithm. In yet another further embodiment, the method 1000 may also include sorting, by the querying module of the processing server, the transaction reference associated with the transaction value included in each of the plurality of transaction messages based on a natural ordering prior to generating the Merkle root.

Computer System Architecture

Figure 11:
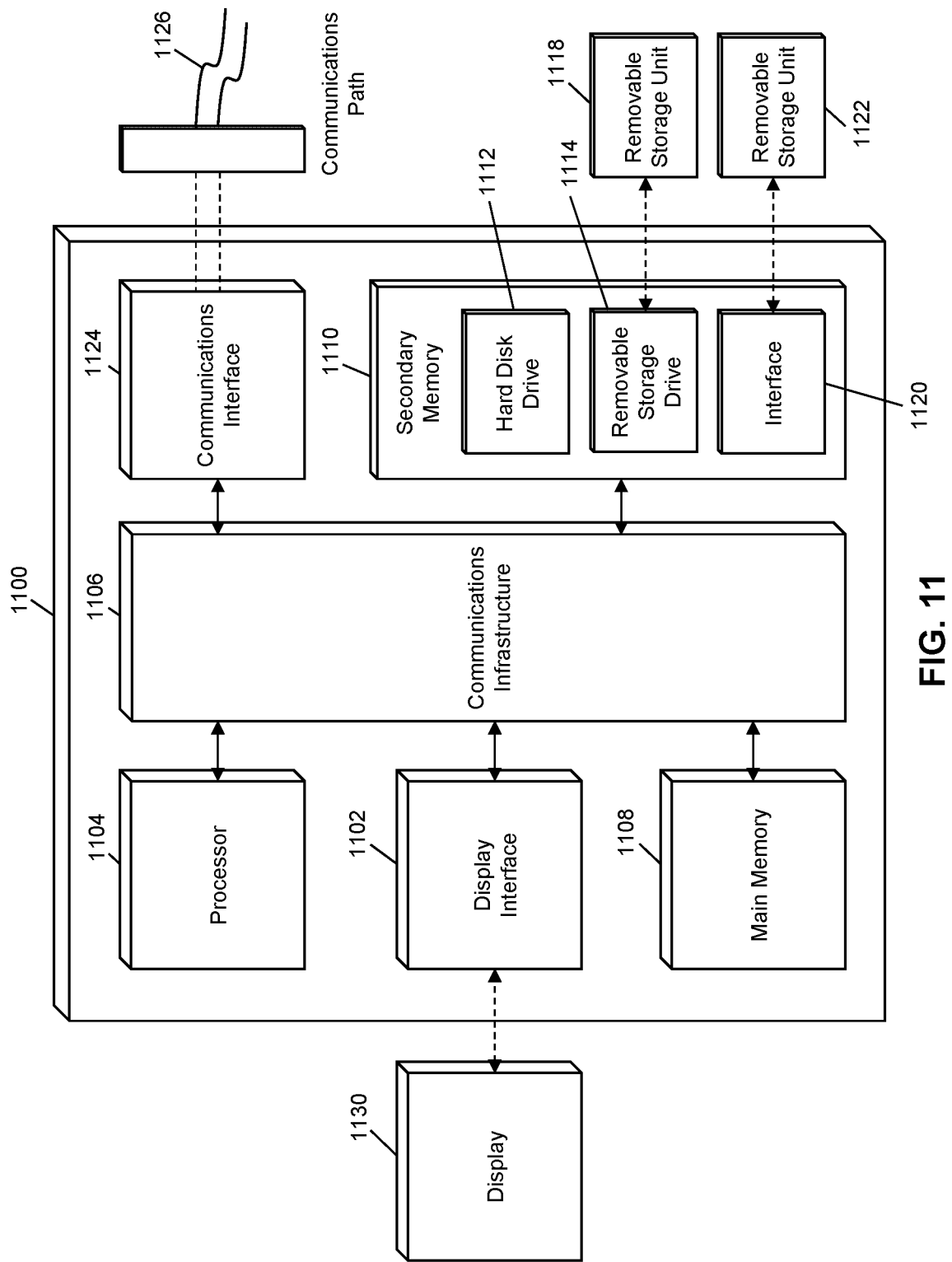
FIG. 11 is a block diagram illustrating a computer system architecture in accordance with exemplary embodiments.

FIG. 11 illustrates a computer system 1100 in which embodiments of the present disclosure, or portions thereof, may be implemented as computer-readable code. For example, the auditing node 102 of FIG. 1 may be implemented in the computer system 1100 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4A, 4B, and 5-10.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1118, a removable storage unit 1122, and a hard disk installed in hard disk drive 1112.

Various embodiments of the present disclosure are described in terms of this example computer system 1100. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general purpose processor device specifically configured to perform the functions discussed herein. The processor device 1104 may be connected to a communications infrastructure 1106, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1100 may also include a main memory 1108 (e.g., random access memory, read-only memory, etc.), and may also include a secondary memory 1110. The secondary memory 1110 may include the hard disk drive 1112 and a removable storage drive 1114, such as a floppy disk drive, a magnetic tape drive, an optical disk drive, a flash memory, etc.

The removable storage drive 1114 may read from and/or write to the removable storage unit 1118 in a well-known manner. The removable storage unit 1118 may include a removable storage media that may be read by and written to by the removable storage drive 1114. For example, if the removable storage drive 1114 is a floppy disk drive or universal serial bus port, the removable storage unit 1118 may be a floppy disk or portable flash drive, respectively. In one embodiment, the removable storage unit 1118 may be non-transitory computer readable recording media.

In some embodiments, the secondary memory 1110 may include alternative means for allowing computer programs or other instructions to be loaded into the computer system 1100, for example, the removable storage unit 1122 and an interface 1120. Examples of such means may include a program cartridge and cartridge interface (e.g., as found in video game systems), a removable memory chip (e.g., EEPROM, PROM, etc.) and associated socket, and other removable storage units 1122 and interfaces 1120 as will be apparent to persons having skill in the relevant art.

Data stored in the computer system 1100 (e.g., in the main memory 1108 and/or the secondary memory 1110) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1100 may also include a communications interface 1124. The communications interface 1124 may be configured to allow software and data to be transferred between the computer system 1100 and external devices. Exemplary communications interfaces 1124 may include a modem, a network interface (e.g., an Ethernet card), a communications port, a PCMCIA slot and card, etc. Software and data transferred via the communications interface 1124 may be in the form of signals, which may be electronic, electromagnetic, optical, or other signals as will be apparent to persons having skill in the relevant art. The signals may travel via a communications path 1126, which may be configured to carry the signals and may be implemented using wire, cable, fiber optics, a phone line, a cellular phone link, a radio frequency link, etc.

The computer system 1100 may further include a display interface 1102. The display interface 1102 may be configured to allow data to be transferred between the computer system 1100 and external display 1130. Exemplary display interfaces 1102 may include high-definition multimedia interface (HDMI), digital visual interface (DVI), video graphics array (VGA), etc. The display 1130 may be any suitable type of display for displaying data transmitted via the display interface 1102 of the computer system 1100, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1108 and secondary memory 1110, which may be memory semiconductors (e.g., DRAMs, etc.). These computer program products may be means for providing software to the computer system 1100. Computer programs (e.g., computer control logic) may be stored in the main memory 1108 and/or the secondary memory 1110. Computer programs may also be received via the communications interface 1124. Such computer programs, when executed, may enable computer system 1100 to implement the present methods as discussed herein. In particular, the computer programs, when executed, may enable processor device 1104 to implement the methods illustrated by FIGS. 3, 4A, 4B, and 5-10, as discussed herein. Accordingly, such computer programs may represent controllers of the computer system 1100.

Where the present disclosure is implemented using software, the software may be stored in a computer program product and loaded into the computer system 1100 using the removable storage drive 1114, interface 1120, and hard disk drive 1112, or communications interface 1124.

The processor device 1104 may comprise one or more modules or engines configured to perform the functions of the computer system 1100. Each of the modules or engines may be implemented using hardware and, in some instances, may also utilize software, such as corresponding to program code and/or programs stored in the main memory 1108 or secondary memory 1110. In such instances, program code may be compiled by the processor device 1104 (e.g., by a compiling module or engine) prior to execution by the hardware of the computer system 1100. For example, the program code may be source code written in a programming language that is translated into a lower level language, such as assembly language or machine code, for execution by the processor device 1104 and/or any additional hardware components of the computer system 1100. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1100 to perform the functions disclosed herein. It will be apparent to persons having skill in the relevant art that such processes result in the computer system 1100 being a specially configured computer system 1100 uniquely programmed to perform the functions discussed above.

Techniques consistent with the present disclosure provide, among other features, systems and methods for the addition of blocks to a permissioned blockchain network using an efficient consensus mechanism and the recovery of extra or missing data in a node in a permissioned blockchain network using bloom filters. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for adding a block to a permissioned blockchain using an efficient consensus mechanism, comprising:
   electronically transmitting, by a processing server, a prepare message to a plurality of auditing nodes associated with a blockchain, wherein the prepare message includes at least a confirmation hash value and a proposal number, wherein the proposal number is a numeric value of a digital signature for a proposed block header that includes a previous hash value and a Merkle root generated for a plurality of transaction messages;
   receiving, by the processing server, a response message from at least a majority of the plurality of auditing nodes, wherein each prepare response message includes at least the confirmation hash value and an accepted proposal number;
   identifying, by the processing server, an agreed proposal number based on the numeric value of the generated proposal number and a numeric value of the accepted proposal number included in each response message and a predetermined criteria;
   electronically transmitting, by the processing server, an accept message to the plurality of auditing nodes, wherein the accept message includes at least the confirmation hash value and the identified agreed proposal number;
   electronically transmitting, by the processing server, a confirm message to a plurality of consensus nodes associated with the blockchain, wherein the confirm message includes at least the confirmation hash value and the identified agreed proposal number; and
   executing, by the processing server, a query on the memory to add a new block to the blockchain, the new block including at least the transaction value included in each of the plurality of transaction messages, a new block header including at least the previous hash value, the generated Merkle root, and the agreed proposal number.

2. The method of claim 1, wherein
   each of the plurality of transaction messages further includes a specific slot identifier,
   the proposed block header, prepare message, response message, accept message, confirm message, and new block header each include the specific slot identifier, and
   the block header included in the recently added block includes a different slot identifier.

3. The method of claim 1, wherein the Merkle root is generated using the transaction value included in each of the plurality of transaction messages.

4. The method of claim 1, further comprising:
   generating, by the processing server, a transaction reference associated with the transaction value included in each of the plurality of transaction messages by hashing the respective transaction value using a predetermined hashing algorithm, wherein
   the Merkle root is generated using the transaction reference included in each of the plurality of transaction messages.

5. The method of claim 1, further comprising:
   storing, in a memory of the processing server, a consensus delay time, wherein
   each of the plurality of transaction messages further includes a common identification value associated with a time, and
   the Merkle root is generated after expiration of the consensus delay time after the time associated with the common identification value.

6. The method of claim 1, further comprising:
   sorting, by the processing server, a transaction reference associated with the transaction value included in each of the plurality of transaction messages based on a natural ordering prior to generating the Merkle root.

7. The method of claim 1, further comprising:
   electronically transmitting, by the processing server, a proposal message to the plurality of consensus nodes, wherein the proposal message includes at least the generated Merkle root.

8. The method of claim 1, further comprising:
   receiving, by the processing server, a proposal message from each of the plurality of consensus nodes, wherein the proposal message includes at least a proposed Merkle root; and
   verifying, by a verification module of the processing server, that the generated Merkle root is equivalent to at least a majority of the proposed Merkle roots included in the received proposal messages.

9. The method of claim 1, wherein
the proposal number is further generated using a nonce in combination with the digital signature,
the prepare message further includes the nonce,
each response message further includes an associated nonce, and
the accept message, confirm message, and new block header further include the nonce associated with the agreed proposal number.

10. The method of claim 1, further comprising:
storing, in a memory, a public key associated with the processing server, wherein
the digital signature is generated for the proposed block header using the public key,
the prepare message further includes the public key,
each response message further includes an associated public key used in generation of the associated accepted proposal number, and
the accept message, confirm message, and new block header further include the public key associated with the agreed proposal number.

11. The method of claim 1, further comprising:
sorting, by the processing server, the proposal number and the accepted proposal number included in each response message based on the respective numeric value, wherein
the agreed proposal number is identified based on the sorting and a predetermined criteria.

12. The method of claim 11, wherein the predetermined criteria is selecting the highest numeric value.

13. A system for adding a block to a permissioned blockchain using an efficient consensus mechanism, comprising:
a memory of the processing server configured to store a blockchain comprising a plurality of blocks including a recently added block, the recently added block including at least a block header and one or more transaction values; and
a processing server, the processing server configured to:
electronically transmit a prepare message to a plurality of auditing nodes associated with the blockchain, wherein the prepare message includes at least a confirmation hash value and a proposal number, wherein the proposal number is a numeric value of a digital signature for a proposed block header that includes a previous hash value and a Merkle root generated for the plurality of transaction messages,
receive a response message from at least a majority of the plurality of auditing nodes, wherein each prepare response message includes at least the confirmation hash value and an accepted proposal number,
identify an agreed proposal number based on the numeric value of the generated proposal number and a numeric value of the accepted proposal number included in each response message and a predetermined criteria,
electronically transmit
an accept message to the plurality of auditing nodes, wherein the accept message includes at least the confirmation hash value and the identified agreed proposal number, and
a confirm message to a plurality of consensus nodes associated with the blockchain, wherein the confirm message includes at least the confirmation hash value and the identified agreed proposal number, and
execute a query on the memory to add a new block to the blockchain, the new block including at least the transaction value included in each of the plurality of transaction messages, a new block header including at least the previous hash value, the generated Merkle root, and the agreed proposal number.

14. The system of claim 13, wherein
each of the plurality of transaction messages further includes a specific slot identifier,
the proposed block header, prepare message, response message, accept message, confirm message, and new block header each include the specific slot identifier, and
the block header included in the recently added block includes a different slot identifier.

15. The system of claim 13, wherein the Merkle root is generated using the transaction value included in each of the plurality of transaction messages.

16. The system of claim 13, wherein the processing server is configured to generate a transaction reference associated with the transaction value included in each of the plurality of transaction messages by hashing the respective transaction value using a predetermined hashing algorithm, and
wherein the Merkle root is generated using the transaction reference included in each of the plurality of transaction messages.

17. The system of claim 13, wherein
the memory is further configured to store a consensus delay time,
each of the plurality of transaction messages further includes a common identification value associated with a time, and
the Merkle root is generated after expiration of the consensus delay time after the time associated with the common identification value.

18. The system of claim 13, wherein the processing server is further configured to sort a transaction reference associated with the transaction value included in each of the plurality of transaction messages based on a natural ordering prior to generating the Merkle root.

19. The system of claim 13, wherein the processing server is further configured to electronically transmit a proposal message to the plurality of consensus nodes, wherein the proposal message includes at least the generated Merkle root.

20. The system of claim 13, wherein the processing server is further configured to:
receive a proposal message from each of the plurality of consensus nodes, wherein the proposal message includes at least a proposed Merkle root, and
verify that the generated Merkle root is equivalent to at least a majority of the proposed Merkle roots included in the received proposal messages.

21. The system of claim 13, wherein the processing server is further configured to generate the proposal number using a nonce in combination with the digital signature,
the prepare message further includes the nonce,
each response message further includes an associated nonce, and
the accept message, confirm message, and new block header further include the nonce associated with the agreed proposal number.

22. The system of claim 13, wherein
the memory is further configured to store a public key associated with the processing server,
the digital signature for the proposed block header using the public key, the prepare message further includes the public key, each response message further includes an associated public key used in generation of the associated accepted proposal number, and the accept message, confirm message, and new block header further include the public key associated with the agreed proposal number.

23. The system of claim 13, wherein the processing server is further configured to sort the proposal number and the accepted proposal number included in each response message based on the respective numeric value, and the agreed proposal number is identified based on the sorting and a predetermined criteria.

24. The system of claim 23, wherein the predetermined criteria is selecting the highest numeric value.

* * * * *